(12) United States Patent
Trivelpiece et al.

(10) Patent No.: US 10,943,228 B2
(45) Date of Patent: Mar. 9, 2021

(54) SYSTEMS AND METHODS FOR SELF-CHECKOUT USING RFID MOTION TRIGGERED TAGS

(71) Applicants: Steve E. Trivelpiece, Rancho Santa Margarita, CA (US); Craig E. Trivelpiece, Mission Viejo, CA (US); Declan Tarrant, Killorglin (IE); Brian Wicks, Escondido, CA (US)

(72) Inventors: Steve E. Trivelpiece, Rancho Santa Margarita, CA (US); Craig E. Trivelpiece, Mission Viejo, CA (US); Declan Tarrant, Killorglin (IE); Brian Wicks, Escondido, CA (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 16/249,233

(22) Filed: Jan. 16, 2019

(65) Prior Publication Data
US 2019/0220844 A1 Jul. 18, 2019

Related U.S. Application Data

(60) Provisional application No. 62/617,904, filed on Jan. 16, 2018.

(51) Int. Cl.
*G06Q 20/32* (2012.01)
*G06K 7/10* (2006.01)
(Continued)

(52) U.S. Cl.
CPC ..... *G06Q 20/3278* (2013.01); *G06K 7/10029* (2013.01); *G06K 7/10366* (2013.01);
(Continued)

(58) Field of Classification Search
CPC .......... G06K 7/10366; G06K 7/10376; G06K 7/10386; G06K 7/10396; G06K 7/10029;
(Continued)

(56) References Cited

U.S. PATENT DOCUMENTS

| 5,119,104 A | * | 6/1992 | Heller | G01S 5/06 342/450 |
| 2007/0075838 A1 | * | 4/2007 | Powell | G06K 7/0008 340/10.2 |

(Continued)

OTHER PUBLICATIONS

International Search Report and Written Opinion dated Apr. 1, 2019 for PCT/US2019/013779.

*Primary Examiner* — Suezu Ellis
(74) *Attorney, Agent, or Firm* — Arent Fox, LLP

(57) ABSTRACT

Systems and methods for self-checkout using an RFID tag. The methods include: detecting motion of the RFID tag using a motion sensor local to the RFID tag; enabling at least one communication operation of the RFID tag in response to the detection of the RFID tag's motion; performing operations by the RFID tag to communicate first information to an enterprise system; using the first information by the enterprise system to associate the RFID tag with an individual of a plurality of individuals present in a given facility; and dynamically changing displayed content of a display device to include information about an object to which the RFID tag is coupled, the display device being in proximity to the individual, in the possession of the individual or being worn by the individual.

9 Claims, 13 Drawing Sheets

(51) Int. Cl.
  *G06K 19/07* (2006.01)
  *G07G 1/00* (2006.01)
  *G06Q 20/20* (2012.01)

(52) U.S. Cl.
  CPC ......... *G06K 19/0723* (2013.01); *G06Q 20/20* (2013.01); *G07G 1/009* (2013.01); *G07G 1/0045* (2013.01)

(58) Field of Classification Search
  CPC ........... G06K 7/10039; G06K 7/10059; G07G 1/0036; G07G 1/0045; G07G 1/009; G06Q 10/087
  See application file for complete search history.

(56) References Cited

U.S. PATENT DOCUMENTS

| | | |
|---|---|---|
| 2008/0308630 A1 | 12/2008 | Bhogal et al. |
| 2012/0235817 A1 | 9/2012 | Forster |
| 2013/0249692 A1* | 9/2013 | Rasband ............ G06Q 30/0639 340/572.1 |
| 2016/0055729 A1* | 2/2016 | Maddox ............. G08B 13/1895 340/572.1 |
| 2016/0093182 A1* | 3/2016 | Turgeon ............. G08B 13/2448 340/572.1 |
| 2016/0260302 A1* | 9/2016 | Ellers ................. G08B 13/2434 |
| 2018/0294844 A1* | 10/2018 | Choi ....................... G06F 3/017 |
| 2018/0350218 A1* | 12/2018 | Jeon ................... G06K 7/10475 |
| 2019/0102611 A1* | 4/2019 | Herring .............. G06K 9/00335 |
| 2019/0102727 A1* | 4/2019 | Trivelpiece ........ G06K 7/10059 |

* cited by examiner

Tag Response Message 1000

Unique Tag Identifier 1002

FIG. 10

Tag Response Message 1100

Motion Indicator 1104

Unique Tag Identifier 1102

FIG. 11

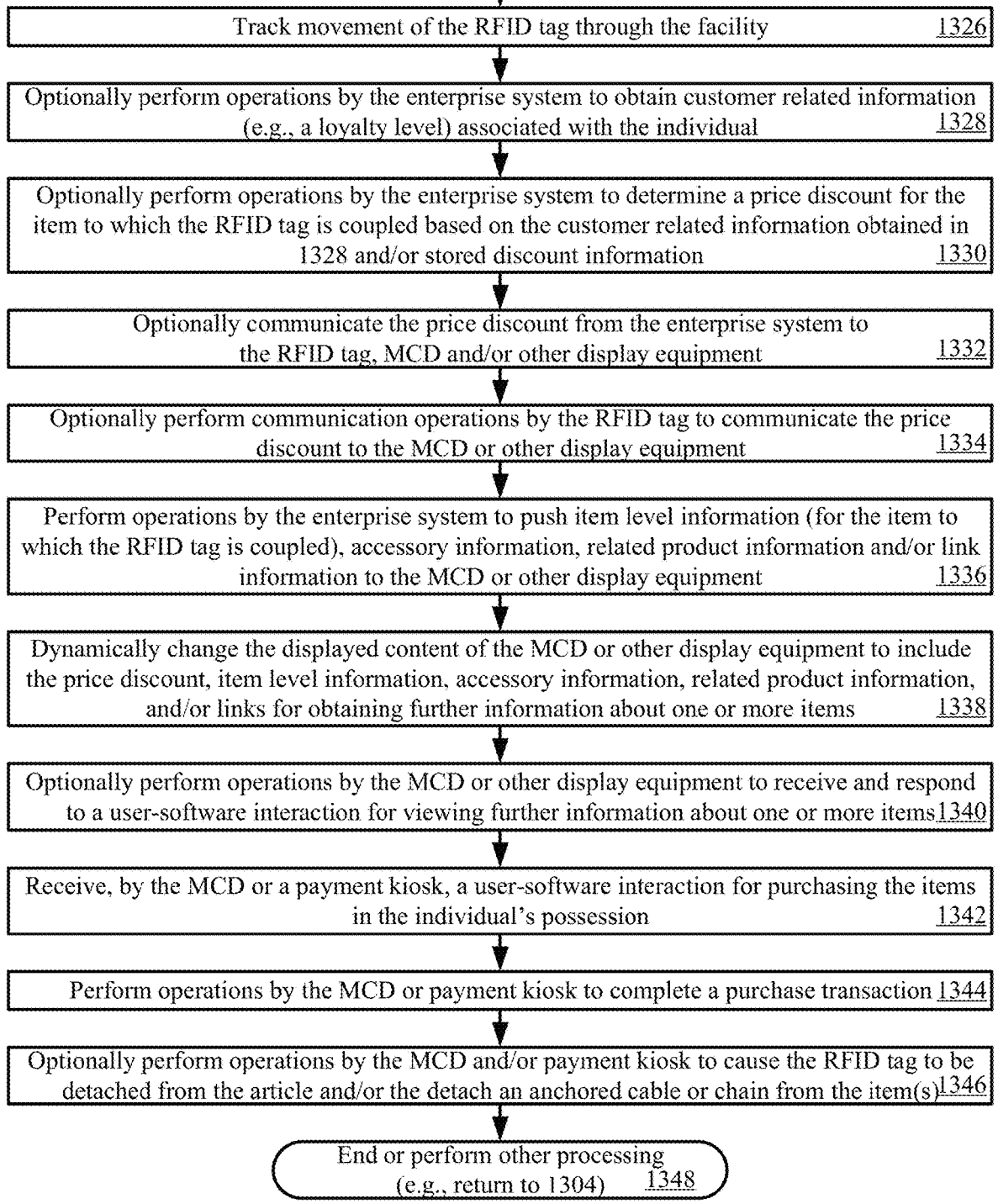

SYSTEMS AND METHODS FOR SELF-CHECKOUT USING RFID MOTION TRIGGERED TAGS

CROSS-REFERENCE TO RELATED APPLICATIONS

The present application claims priority to U.S. Patent Ser. No. 62/617,904 which was filed on Jan. 16, 2018. This application is incorporated herein by reference in its entirety.

BACKGROUND

Statement of the Technical Field

The present disclosure relates generally to Radio Frequency Identification ("RFID") systems. More particularly, the present disclosure relates to implementing systems and methods for self-checkout using RFID motion triggered tags.

Description of the Related Art

Inventory solutions often use passive RFID tags because of their size, cost and mature infrastructure. However, passive RFID was never designed to support the vast number of tags, long read range, large number of readers, fast response times, location detection, and the high accuracy needed for a real-world solution.

Battery Assisted Passive ("BAP") RFID tags greatly help with the read range (increasing the read range from, for example, 1-10 meters to 15-100 meters) but also increase size, cost and complexity. In addition, the batteries must be replaced.

SUMMARY

The present disclosure related to implementing systems and methods for self-checkout using an RFID tag. The methods comprise: detecting motion of the RFID tag using a motion sensor local to the RFID tag; enabling at least one communication operation of the RFID tag in response to the detection of the RFID tag's motion; performing operations by the RFID tag to communicate first information to an enterprise system; using the first information by the enterprise system to associate the RFID tag with an individual of a plurality of individuals present in a given facility; and dynamically changing displayed content of a display device to include information about an object to which the RFID tag is coupled, the display device being in proximity to the individual, in the possession of the individual or being worn by the individual.

BRIEF DESCRIPTION OF THE DRAWINGS

The present solution will be described with reference to the following drawing figures, in which like numerals represent like items throughout the figures.

FIG. 10 is an illustration of a tag response message.

FIG. 11 is an illustration of another tag response message.

FIGS. 13A-13B (collectively referred to herein as "FIG. 13") provide a flow diagram of an illustrative method for self-checkout using RFID tags.

DETAILED DESCRIPTION

Figure 1:
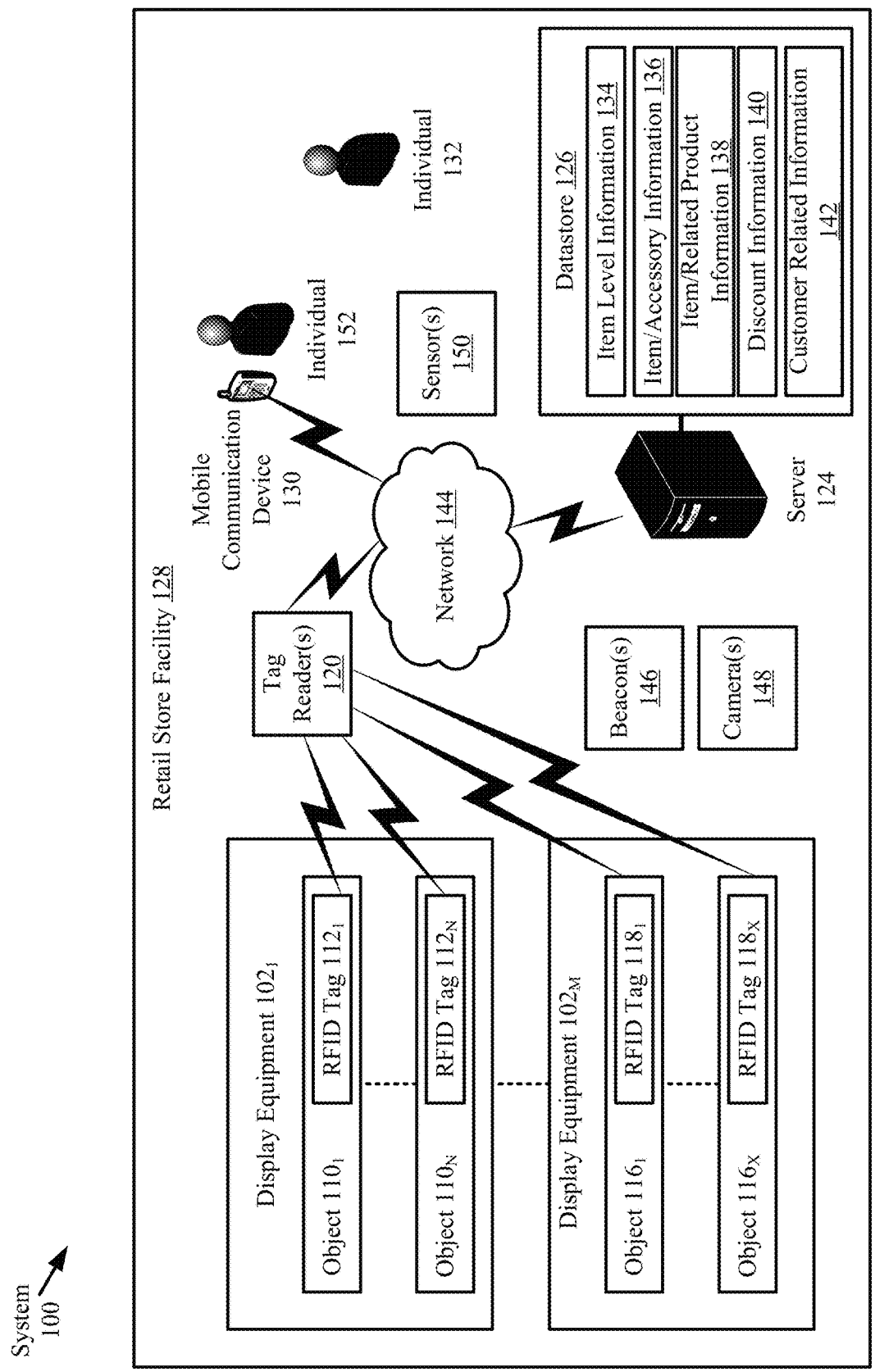
FIG. 1 is an illustration of an illustrative architecture for a system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

There is a need for a solution that improves the read range of a passive RFID tag while keeping size, cost and response time low. In addition, the solution can advantageously include a very small, rechargeable power source (e.g., battery or capacitor) so that it keeps the cost and size low, and eliminates the need for battery changes. Low cost versions can use a non-rechargeable battery when a fixed battery has enough energy to last for the lifetime of the RFID tagged product.

The present solution generally concerns systems and methods for determining inventory using time slotted tag communications. The present solution solves the following problems:
  how to have a battery assisted passive RFID tag without constant battery drain caused by constant inventory reading which is needed to monitor tag motion and for full inventory count;
  how to have a battery assisted passive RFID tag with great read range without having very large numbers of tags constantly attempting to communicate causing delays and communication collisions;
  how to have a battery assisted passive RFID tag that can still be read often enough for a full inventory count in an area; and
  how to enable detection of a tag that is being moved or stolen.

The present solution can use standard RFID tags and readers (with a software update) but could be designed to incorporate the functioning into a new and compatible RFID tag chip as well. Initially, the RFID tag would need to be supplemented with a rechargeable power source (e.g., a battery and/or a capacitor), a Central Processing Unit ("CPU"), an accelerometer and/or motion detector.

Just as in normal RFID implementations, RFID tag readers are constantly scanning their Field Of View ("FOV") and requesting that all tags in its coverage area respond to interrogation signals. The present solution solves these problems with two novel features: (A) time based RFID tag communications control (e.g., disabling a receiver, disabling a transceiver or transmitter, disabling a communications operation, bypassing a communications device or operation, and/or disabling a response from the RFID tag); and (B) motion based RFID tag communications control. The RFID tag control of (A) involves controlling the RFID tag so that it only enables its communications functionality (e.g., enables a receiver, enables a transceiver or transmitter, enables at least one communications operation, and/or discontinues a bypass of a communications device or operation) periodically under system control. This is for improved static inventory counting. The RFID communications control of (B) involves turning on, enabling or no longer bypassing the RFID receiver, the RFID transceiver/transmitter and/or at least one communications operation when motion is detected and continuing to receive interrogation signals while in motion. This is for loss prevention and tag location tracking.

Novel feature (A) provides better full inventory counts. In the present solution, the RFID chip is scheduled to only enable (or turn on) or no longer bypass its communication device (e.g., a transceiver) or communications operation(s) one or two times a day, and to disable (or turn off) or bypass its communication device (e.g., transceiver) or communications operation(s) after communication with a tag reader completes or a timing window expires. The timing of the RFID tag communications is distributed over a given time period (e.g., a day or 24 hours) so that any time slot will only be assigned to a very small percentage of the RFID tags. This enables fast reading cycles, minimizes communications collisions, and enables identifying every tag.

Novel feature (A) also vastly reduces the RFID tags' battery drain. The main power drain on the battery is from the receiver and CPU. In the present solution, these components are only active for a few seconds per day (out of 86,400 seconds). The rest of the time the RFID tags can capture energy for charging the battery from the received RF energy and other sources of energy harvesting. This allows for a very small, low cost rechargeable battery or capacitor. A rechargeable energy storage is not required. For some applications, a primary battery (e.g., a lithium coin cell) can be used without recharging. If a small battery can supply energy for the expected life time of the tag, then a fixed battery could be used to reduce the costs. For example, a swing ticket could have a small battery that lasts less than one year.

Novel feature (A) further improves tag read range which reduces infrastructure costs. Using battery assisted tags changes the tag read range from, for example, 1-10 meters to 15-100 meters. This significantly reduces infrastructure installation costs since less tag readers are needed to cover a given area as compared to that needed in conventional systems, while improving overall performance in previously hard to read areas.

Novel feature (B) ensures that tags in motion respond to interrogation signals even at times when they are not scheduled to communicate during time slots. The system can now track an RFID tag while it is in motion and also detect where/when this tag motion stops. Novel feature (B) also facilitates better inventory counts, improved read ranges, and reduced infrastructure costs.

The present solution also solves the following problems:
  how to determine what tags an individual (e.g., a customer or shopper) has in his(her) immediate vicinity and are looking to buy or desire additional information about;
  how to give individuals (e.g., customers or shoppers) immediate and additional information on products;
  how to inform the individual (e.g., a customer or shopper) of sales, promotions, and mark downs on the products they are looking at; and
  how to allow the individual (e.g., customer or shopper) to see the price or totals of the items (s)he has in his(her) possession, and allow the individual to purchase the items without going through a standard checkout line.

The present solution employs the following new technologies to solve the above-stated problems:
  a device (e.g., a smart phone, a smart watch, a tablet computer, etc.) for each individual (e.g., customer or shopper) that is configured to read RFID tags and associate the read tags with himself or herself;

a link into an inventory system and a link to the Internet so that additional information about items can be obtained and presented to the individual via the device or other output means (e.g., a kiosk);

real-time positioning software operative to (a) track the motion of mobile devices (e.g., WiFi, Bluetooth, etc.), (b) track moving tags' paths of travel through a facility (e.g., using RFID readers and/or beacons), and (c) associate the moving tags with a particular individual (e.g., customer or shopper) by correlating matching paths of travel and timing.

software that uses analytics and correlation algorithms to positively associate groups of tags with a particular device being used by an individual;

hardware and software configured to detect gesture motions of a tag and use such detections as a trigger for various actions (e.g., provide assistance to the individual interacting with the tag, associate the tag with a mobile device having a similar simultaneous gesture, and/or for providing additional information about the item to which the tag is coupled to the individual interacting with the tag); and/or using gesture detection functions to associate a tag coupled to an item anchored by a cable or chain with a mobile device.

The last item addresses scenarios in which high priced items are anchored by a cable or chain to display equipment, and require a store employee to disconnect the item when the customer wishes to purchase the same. With the gesture detection functions, an RFID tag can act as a self-detaching tag through RFID commands. The motion/gesture of the tag and the location detection of the mobile device can be used to pair the tag with the mobile device for a customer to see, approve, and purchase the item. During a purchase transaction, an RFID command is sent to the RFID tag to detach the anchored cable or chain.

Illustrative Systems

Referring now to FIG. 1, there is provided a schematic illustration of an illustrative system 100 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items need to be located and/or tracked.

The system 100 is generally configured to allow (a) improved inventory counts of objects and/or items located within a facility, and (b) improved customer experiences. As shown in FIG. 1, system 100 comprises a Retail Store Facility ("RSF") 128 in which display equipment $102_1, \ldots, 102_M$ is disposed. The display equipment is provided for displaying objects (or items) $110_1$-$110_N$, $116_1$-$116_X$ to customers of the retail store. The display equipment can include, but is not limited to, shelves, article display cabinets, promotional displays, fixtures and/or equipment securing areas of the RSF 128. The RSF can also include emergency equipment (not shown), checkout counters and an EAS system (not shown). Emergency equipment, checkout counters, video cameras, people counters, and EAS systems are well known in the art, and therefore will not be described herein.

At least one tag reader 120 is provided to assist in counting and tracking locations the objects $110_1$-$110_N$, $116_1$-$116_X$ within the RSF 128. The tag reader 120 comprises an RFID reader configured to read RFID tags. RFID readers are well known in the art, and therefore will not be described herein. Any known or to be known RFID reader can be used herein without limitation.

RFID tags $112_1$-$112_N$, $118_1$-$118_X$ are respectively attached or coupled to the objects $110_1$-$110_N$, $116_1$-$116_X$. This coupling is achieved via an adhesive (e.g., glue, tape or sticker), a mechanical coupler (e.g., straps, clamps, snaps, etc.), a weld, chemical bond or other means. The RFID tags are described herein as comprising single-technology tags that are only RFID enabled. The present solution is not limited in this regard. The RFID tags can alternatively or additionally comprise dual-technology tags that have both EAS and RFID capabilities.

Notably, the tag reader 120 is strategically placed at a known location within the RSF 128. By correlating the tag reader's RFID tag reads and the tag reader's known location within the RSF 128, it is possible to determine the location of objects $110_1, \ldots, 110_N$, $116_1, \ldots, 116_X$ within the RSF 128. The tag reader's known coverage area also facilitates object location determinations. Accordingly, RFID tag read information and tag reader location information is stored in a datastore 126. This information can be stored in the datastore 126 using a server 124 and network 144 (e.g., an Intranet and/or Internet).

System 100 also comprises a Mobile Communication Device ("MCD") 130. MCD 130 includes, but is not limited to, a cell phone, a smart phone, a table computer, a personal digital assistant, and/or a wearable device (e.g., a smart watch). Each of the listed devices is well known in the art, and therefore will not be described herein. In accordance with the present solution, the MCD 130 has a software application installed thereon that is operative to: facilitate the provision of various information 134-142 to the individual 152; facilitate a purchase transaction; and/or facilitate the detachment of the RFID tags $112_1$-$112_N$, $118_1$-$118_X$ from the objects $110_1, \ldots, 110_N$, $116_1, \ldots, 116_X$; and/or facilitate the detachment of an anchored chain or cable from the objects $110i, \ldots, 110_N$, $116_1, \ldots, 116_X$.

The MCD 130 is generally configured to provide a visual and/or auditory output of item level information 134, accessory information 136, related product information 138, discount information 140 and/or customer related information 142. The item level information includes, but is not limited to, an item description, item nutritional information, a promotional message, an item regular price, an item sale price, a currency symbol, and/or a source of the item.

An accessory includes, but is not limited to, a useful auxiliary item that can be attached to or removed from an item (e.g., a drill bit or battery of a drill). The accessory information includes, but is not limited to, an accessory description, accessory nutritional information, a promotional message, an accessory regular price, an accessory sale price, a currency symbol, a source of the accessory, and/or an accessory location in the facility.

A related product includes, but is not limited to, a product that can be used in conjunction with or as an alternative to another product (e.g., diaper rash cream which can be used when changing a diaper, or a first diaper can be used as an alternative to another diaper). The related product information includes, but is not limited to, a related product description, related product nutritional information, a promotional message, a related product regular price, a related product sale price, a currency symbol, a source of the related product, and/or a related product location in the facility.

The discount information can include, but is not limited to, a discount price for a product based on a loyalty level or other criteria. The customer related information includes, but is not limited to, customer account numbers, customer identifiers, usernames, passwords, payment information, loyalty levels, historical purchase information, and/or activity trends.

The item level information, accessory information, related product information and/or discount information can be output in a format selected from a plurality of formats based on a geographic location of the item, a location of the MCD, a date, and/or an item pricing status (i.e., whether the item is on sale). In a display context, the format is defined by a font parameter, a color parameter, a brightness parameter, and/or a display blinking parameter. In an auditory context, the format is defined by a volume parameter, a voice tone parameter, and/or a male/female voice selected parameter.

The MCD 130 can also be configured to read barcodes and/or RFID tags. Information obtained from the barcode and/or RFID tag reads may be communicated from the MCD 130 to the server 124 via network 144. Similarly, the stored information 134-142 is provided from the server 124 to the MCD 130 via network 144. The network 144 includes, an Intranet and/or the Internet.

Server 124 can be local to the facility 128 as shown in FIG. 1 or remote from the facility 128. Server 124 will be described in more detail below in relation to FIG. 4. Still, it should be understood that server 124 is configured to: write data to and read data from datastore 126, RFID tags $112_1$-$112_N$, $118_1$-$118_X$, and/or MCD 130; perform language and currency conversion operations using item level information and/or accessory information obtained from the datastore, RFID tags, and/or MCD; perform data analytics based on inventory information, tag read information, MCD tacking information, and/or information 134-142; perform image processing using images captured by camera(s) 148; and/or determine locations of RFID tags and/or MCDs in the RSF 128 using beacon(s) 146, tag reader 120 or other devices having known locations and/or antenna patterns.

The server 124 facilitates updates to the information 134-142 output from the MCD 130. Such information updating can be performed periodically, in response to instructions received from an associate (e.g., a retail store employee 132), in response to a detected change in the item level, accessory and/or related product information, in response to a detection that an individual is in proximity to an RFID tag, and/or in response to any motion or movement of the RFID tag. For example, if a certain product is placed on sale, then the sale price for that product is transmitted to MCD 130 via network 144 and/or RFID tag. The sale price is then output from the MCD 130. The present solution is not limited to the particulars of this example.

Although a single MCD 130 and/or a single server 124 is(are) shown in FIG. 1, the present solution is not limited in this regard. It is contemplated that more than one computing device can be implemented. Also, the present solution is not limited to the illustrative system architecture described in relation to FIG. 1.

During operation of system 100, the content displayed on the display screen of the MCD 130 is dynamically controlled based upon various tag or item related information and/or customer related information (e.g., mobile device identifier, mobile device location in RSF 128, and/or customer loyalty level). Tag or item level information includes, but is not limited to, first information indicating that an RFID tag is in motion or that an object is being handled by an individual 152, second information indicating a current location of the RFID tag and/or the MCD 130, third information indicating an accessory or related product of the object to which the moving RFID tag is coupled, and/or fourth information indicating the relative locations of the accessory and the moving RFID tag and/or the relative locations of the related product and the moving RFID tag. The first, second and fourth information can be derived based on sensor data generated by sensors local to the RFID tag. Accordingly, the RFID tags $112_1$-$112_N$, $118_1$-$118_X$ include one or more sensors to detect their current locations, detect any individual in proximity thereto, and/or detect any motion or movement thereof. The sensors include, but are not limited to, an Inertial Measurement Unit ("IMU"), a vibration sensor, a light sensor, an accelerometer, a gyroscope, a proximity sensor, a microphone, and/or a beacon communication device. The third information can be stored local to the RFID tag(s) or in a remote datastore 126 as information 136, 138.

In some scenarios, the MCD 130 facilitates the server's 124 (a) detection of when the individual 152 enters the RSF 128, (b) tracking of the individual's movement through the RSF, (c) detection of when the individual is in proximity to an object to which an RFID tag is coupled, (d) determination that an RFID tag is being handled or moved by the individual based on a time stamped pattern of MCD movement and a timestamped pattern of RFID tag movement, and/or (e) determination of an association of moving RFID tags and the individual.

When a detection is made that an RFID tag is being moved, the server 124 can, in some scenarios, obtain customer related information (such as a loyalty level) 142 associated with the individual 152. This information can be obtained from the individual's MCD 130 and/or the datastore 126. The customer related information 142 is then used to retrieve discount information 140 for the object to which the RFID tag is coupled. The retrieved discount information is then communicated from the server 124 to the individual's MCD 130. The individual's MCD 130 can output the discount information in a visual format and/or an auditory format. Other information may also be communicated from the server 124 to the individual's MCD 130. The other information includes, but is not limited to, item level information, accessory information, and/or related product information.

In those or other scenarios, a sensor embedded in the RFID tag detects when an individual is handling the object to which the RFID tag is coupled. When such a detection is made, the RFID tag retrieves the object's unique identifier from its local memory, and wirelessly communicates the same to the tag reader 120. The tag reader 120 then passes the information to the server 124. The server 124 uses the object's unique identifier and the item/accessory relationship information (e.g., table) 136 to determine if there are any accessories associated therewith. If no accessories exist for the object, the server 124 uses the item level information 134 to determine one or more characteristics of the object. For example, the object includes a product of a specific brand. The server 124 then uses the item/related product information (e.g., table) 138 to identify: other products of the same type with the same characteristics; and/or other products that are typically used in conjunction with the object. Related product information for the identified related products is then retrieved and provided to the MCD 130. The MCD 130 can output the related product information in a visual format and/or an auditory format. The individual 152 can perform user-software interactions with the MCD 130 to obtain further information obtain the related product of interest. The present solution is not limited to the particulars of this scenario.

Figure 2:
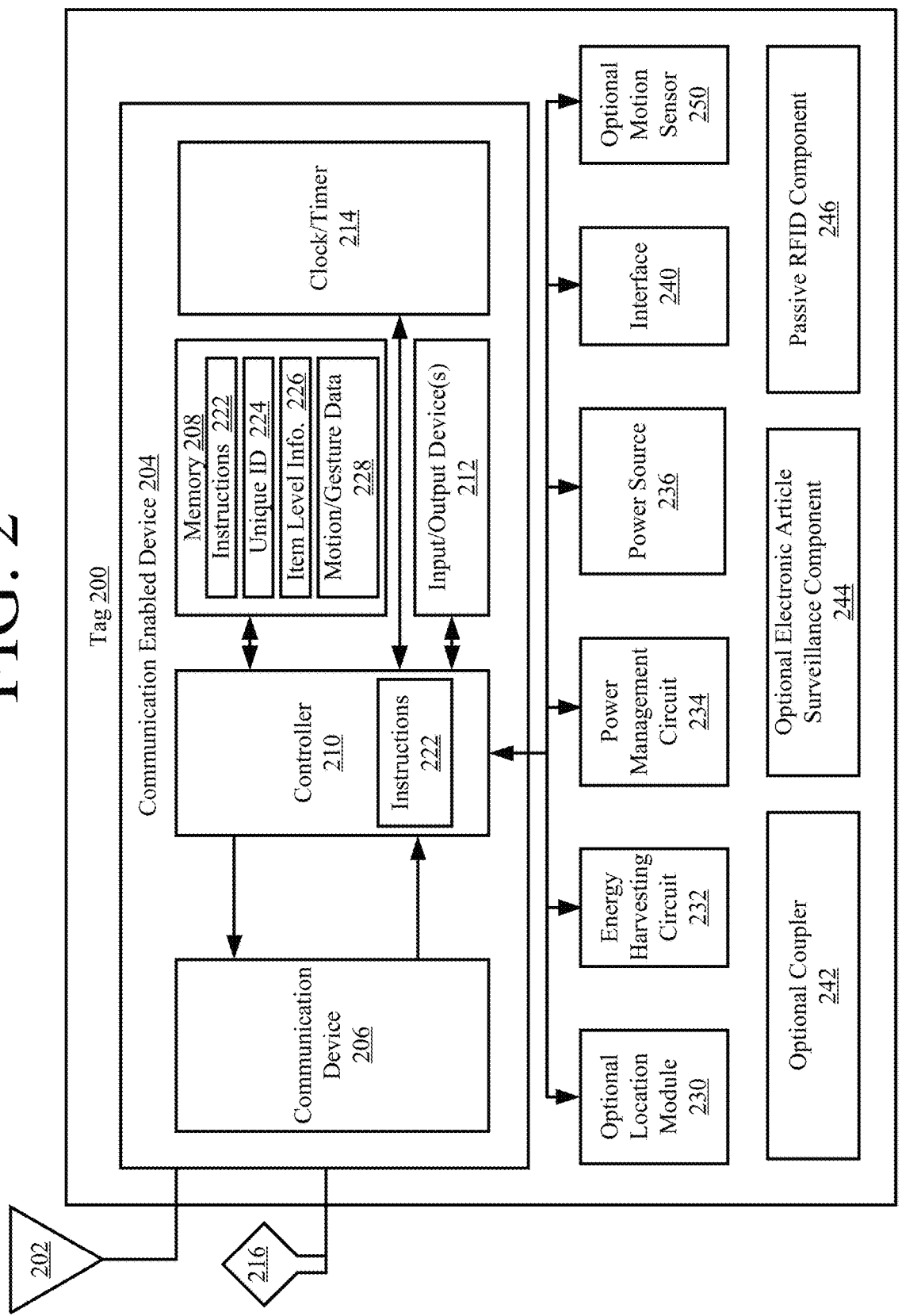
FIG. 2 is an illustration of an illustrative architecture for a tag.

Referring now to FIG. 2, there is an illustration of an illustrative architecture for a tag 200. RFID tags $112_1, \ldots, 112_N, 118_1, \ldots, 118_X$ are the same as or similar to tag 200. As such, the discussion of tag 200 is sufficient for understanding the RFID tags $112_1, \ldots, 112_N, 118_1, \ldots, 118_X$ of FIG. 1. Tag 200 is generally configured to perform operations to (a) minimize power usage so as to extend a power source's life (e.g., a battery or a capacitor), (b) minimize collisions with other tags so that the tag of interest can be seen at given times, (c) optimize useful information within an inventory system (e.g., communicate useful change information to a tag reader), and/or (d) optimize local feature functions.

The tag 200 can include more or less components than that shown in FIG. 2. However, the components shown are sufficient to disclose an illustrative embodiment implementing the present solution. Some or all of the components of the tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative tag 200 configured to facilitate improved inventory management and customer experience. In this regard, the tag 200 is configured for allowing data to be exchanged with an external device (e.g., tag reader 120 of FIG. 1, a beacon 146 of FIG. 1, a Mobile Communication Device ("MCD") 130 of FIG. 1, and/or server 124 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is) are employed: Radio Frequency ("RF") communication technology; Bluetooth technology; WiFi technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 206-214 shown in FIG. 2 may be collectively referred to herein as a communication enabled device 204, and include a memory 208 and a clock/timer 214. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM") and flash memory. The memory 208 may also comprise unsecure memory and/or secure memory.

In some scenarios, the communication enabled device 204 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 208. Notably, the communication protocols can be downloaded to the device at any given time. The initial/default role (being an RFID, WiFi, LiFi, etc. tag) can be assigned at the deployment thereof. If the user desires to use another protocol at a later time, the user can remotely change the communication protocol of the deployed tag 200. The update of the firmware, in case of issues, can also be performed remotely.

As shown in FIG. 2, the communication enabled device 204 comprises at least one antenna 202, 216 for allowing data to be exchanged with the external device via a wireless communication technology (e.g., an RFID technology, an NFC technology, a SRC technology, and/or a beacon technology). The antenna 202, 216 is configured to receive signals from the external device and/or transmit signals generated by the communication enabled device 204. The antenna 202, 216 can comprise a near-field or far-field antenna. The antennas include, but are not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 generates and transmits signals (e.g., RF carrier signals) to external devices, as well as receives signals (e.g., RF signals) transmitted from external devices. In this way, the communication enabled device 204 facilitates the registration, identification, location and/or tracking of an item (e.g., object 110 or 112 of FIG. 1) to which the tag 200 is coupled.

The communication enabled device 204 is configured so that it: communicates (transmits and receives) in accordance with a time slot communication scheme; and selectively enables/disables/bypasses the communication device (e.g., transceiver) or at least one communications operation based on output of a motion sensor 250. In some scenarios, the communication enabled device 204 selects: one or more time slots from a plurality of time slots based on the tag's unique identifier 224 (e.g., an Electronic Product Code ("EPC")); and/or determines a Window Of Time ("WOT") during which the communication device (e.g., transceiver) 206 is to be turned on or at least one communications operation is be enabled subsequent to when motion is detected by the motion sensor 250. The WOT can be determined based on environmental conditions (e.g., humidity, temperature, time of day, relative distance to a location device (e.g., beacon or location tag), etc.) and/or system conditions (e.g., amount of traffic, interference occurrences, etc.). In this regard, the tag 200 can include additional sensors not shown in FIG. 2.

The communication enabled device 204 also facilitates the automatic and dynamic modification of item level information 226 that is being or is to be output from the tag 200 in response to certain trigger events. The trigger events can include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the tag 200 can be stored in memory 208 of the communication enabled device 204 and/or communicated to other external devices (e.g., tag reader 120 of FIG. 1, beacon 146 of FIG. 1, MCD 130 of FIG. 1, and/or server 124 of FIG. 1) via communication device (e.g., transceiver) 206 and/or interface 240 (e.g., an Internet Protocol or cellular network interface). For example, the communication enabled device 204 can communicate information specifying a timestamp, a unique identifier for an item, item description, item price, a currency symbol and/or location information to an external device. The external device (e.g., server or MCD) can then store the information in a database (e.g., database 126 of FIG. 1) and/or use the information for various purposes.

The communication enabled device 204 also comprises a controller 210 (e.g., a CPU) and input/output devices 212. The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, within the controller 210 during execution thereof by the tag 200. The memory 208 and the controller 210 also can constitute machine-readable media. The term "machine-readable media", as used here, refers to a single medium or multiple media (e.g., a centralized or distributed database, and/or associated caches and servers) that store the one or more sets of instructions 222. The term "machine-readable media", as used here, also refers to any medium that is capable of storing, encoding or carrying a set of instructions 222 for execution by the tag 200 and that cause the tag 200 to perform any one or more of the methodologies of the present disclosure.

The input/output devices can include, but are not limited to, a display (e.g., an E Ink display, an LCD display and/or an active matrix display), a speaker, a keypad and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the tag 200 (e.g., when motion thereof has been detected) and/or for notifying the person of a particular pricing status (e.g., on sale status) of the item to which the tag is coupled.

The clock/timer 214 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic location can be used herein without limitation including relative positioning within a facility or structure.

The optional coupler 242 is provided to securely or removably couple the tag 200 to an item (e.g., object 110 or 112 of FIG. 1). The coupler 242 includes, but is not limited to, a mechanical coupling means (e.g., a strap, clip, clamp, snap) and/or adhesive (e.g., glue or sticker). The coupler 242 is optional since the coupling can be achieved via a weld and/or chemical bond.

The tag 200 can also include a power source 236, an optional Electronic Article Surveillance ("EAS") component 244, and/or a passive/active/semi-passive RFID component 246. Each of the listed components 236, 244, 246 is well known in the art, and therefore will not be described herein. Any known or to be known battery, EAS component and/or RFID component can be used herein without limitation. The power source 236 can include, but is not limited to, a rechargeable battery and/or a capacitor.

As shown in FIG. 2, the tag 200 further comprises an energy harvesting circuit 232 and a power management circuit 234 for ensuring continuous operation of the tag 200 without the need to change the rechargeable power source (e.g., a battery). In some scenarios, the energy harvesting circuit 232 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy. Energy harvesting circuits are well known in the art, and therefore will not be described herein. Any known or to be known energy harvesting circuit can be used herein without limitation.

As noted above, the tag 200 may also include a motion sensor 250. Motion sensors are well known in the art, and therefore will not be described herein. Any known or to be known motion sensor can be used herein without limitation. For example, the motion sensor 250 includes, but is not limited to, a vibration sensor, an accelerometer, a gyroscope, a linear motion sensor, a Passive Infrared ("PIR") sensor, a tilt sensor, and/or a rotation sensor.

The motion sensor 250 is communicatively coupled to the controller 210 such that it can notify the controller 210 when tag motion is detected. The motion sensor 250 also communicates sensor data to the controller 210. The sensor data is processed by the controller 210 to determine whether or not the motion is of a type for triggering enablement of the communication device (e.g., transceiver) 206 or at least one communications operation. For example, the sensor data can be compared to stored motion/gesture data 228 to determine if a match exists therebetween. More specifically, a motion/gesture pattern specified by the sensor data can be compared to a plurality of motion/gesture patterns specified by the stored motion/gesture data 228. The plurality of motion/gesture patterns can include, but are not limited to, a motion pattern for walking, a motion pattern for running, a motion pattern for vehicle transport, a motion pattern for vibration caused by equipment or machinery in proximity to the tag (e.g., an air conditioner or fan), a gesture for requesting assistance, a gesture for obtaining additional product information, and/or a gesture for product purchase. The type of movement (e.g., vibration or being carried) is then determined based on which stored motion/gesture data matches the sensor data. This feature of the present solution allows the tag 200 to selectively enable the communication device (e.g., transceiver) or at least one communications operation only when the tag's location within a facility is actually being changed (e.g., and not when a fan is causing the tag to simply vibrate).

In some scenarios, the tag 200 can be also configured to enter a sleep state in which at least the motion sensor triggering of communication operations is disabled. This is desirable, for example, in scenarios when the tag 200 is being shipped or transported from a distributor to a customer. In those or other scenarios, the tag 200 can be further configured to enter the sleep state in response to its continuous detection of motion for a given period of time. The tag can be transitioned from its sleep state in response to expiration of a defined time period, the tag's reception of a control signal from an external device, and/or the tag's detection of no motion for a period of time.

The power management circuit 234 is generally configured to control the supply of power to components of the tag 200. In the event all of the storage and harvesting resources deplete to a point where the tag 200 is about to enter a shutdown/brownout state, the power management circuit 234 can cause an alert to be sent from the tag 200 to a remote device (e.g., tag reader 120 or server 124 of FIG. 1). In response to the alert, the remote device can inform an associate (e.g., a store employee 132 of FIG. 1) so that (s)he can investigate why the tag 200 is not recharging and/or holding charge.

The power management circuit 234 is also capable of redirecting an energy source to the tag's 200 electronics based on the energy source's status. For example, if harvested energy is sufficient to run the tag's 200 function, the power management circuit 234 confirms that all of the tag's 200 storage sources are fully charged such that the tag's 200 electronic components can be run directly from the harvested energy. This ensures that the tag 200 always has stored energy in case harvesting source(s) disappear or lesser energy is harvested for reasons such as drop in RF, light or vibration power levels. If a sudden drop in any of the energy sources is detected, the power management circuit 234 can cause an alert condition to be sent from the tag 200 to the remote device (e.g., tag reader 120 or server 124 of FIG. 1). At this point, an investigation may be required as to what caused this alarm. Accordingly, the remote device can inform the associate (e.g., a store employee 132 of FIG. 1) so that (s)he can investigate the issue. It may be that other merchandise are obscuring the harvesting source or the item is being stolen.

The present solution is not limited to that shown in FIG. 2. The tag 200 can have any architecture provided that it can perform the functions and operations described herein. For example, all of the components shown in FIG. 2 can comprise a single device (e.g., an Integrated Circuit ("IC")). Alternatively, some of the components can comprise a first tag element (e.g., a Commercial Off The Shelf ("COTS") tag) while the remaining components comprise a second tag element communicatively coupled to the first tag element. The second tag element can provide auxiliary functions (e.g., motion sensing, etc.) to the first tag element. The second tag element may also control operational states of the first tag element. For example, the second tag element can selectively (a) enable and disable one or more features/operations of the first tag element (e.g., transceiver operations), (b) couple or decouple an antenna to and from the first tag element, (c) bypass at least one communications device or operation, and/or (d) cause an operational state of the first tag element to be changed (e.g., cause transitioning the first tag element between a power save mode and non-power save mode). In some scenarios, the operational state change can be achieved by changing the binary value of at least one state bit (e.g., from 0 to 1, or vice versa) for causing certain communication control operations to be performed by the tag 200. Additionally or alternatively, a switch can be actuated for creating a closed or open circuit. The present solution is not limited in this regard.

Figure 3:
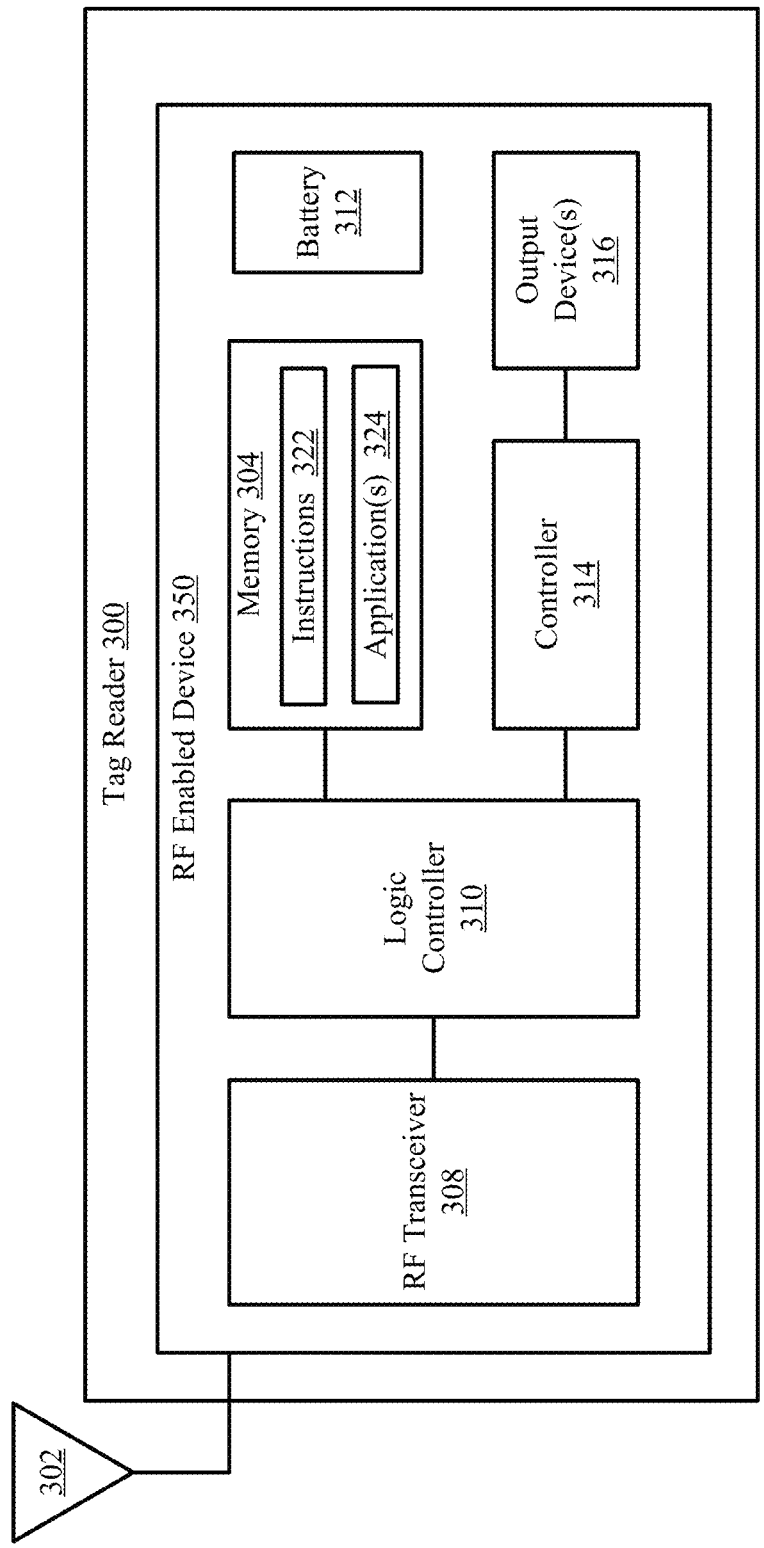
FIG. 3 is an illustration of an illustrative architecture for a tag reader.

Referring now to FIG. 3, there is provided a detailed block diagram of an exemplary architecture for a tag reader 300. Tag reader 120 of FIG. 1 is the same as or similar to tag reader 200. As such, the discussion of tag reader 200 is sufficient for understanding tag reader 120.

Tag reader 300 may include more or less components than that shown in FIG. 3. However, the components shown are sufficient to disclose an illustrative embodiment implementing the present solution. Some or all of the components of the tag reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an illustration of a representative tag reader 300 configured to facilitate improved inventory counts and management within an RSF (e.g., RSF 128 of FIG. 1). In this regard, the tag reader 200 comprises an RF enabled device 350 for allowing data to be exchanged with an external device (e.g., RFID tags $112_1, \ldots, 112_N, 118_1, \ldots, 118_X$ of FIG. 1) via RF technology. The components 304-316 shown in FIG. 3 may be collectively referred to herein as the RF enabled device 350, and may include a power source 312 (e.g., a battery) or be connected to an external power source (e.g., an AC mains).

The RF enabled device 350 comprises an antenna 302 for allowing data to be exchanged with the external device via RF technology (e.g., RFID technology or other RF based technology). The external device may comprise RFID tags $112_1, \ldots, 112_N, 118_1, \ldots, 118_X$ of FIG. 1. In this case, the antenna 302 is configured to transmit RF carrier signals (e.g., interrogation signals) to the listed external devices, and/or transmit data response signals (e.g., authentication reply signals) generated by the RF enabled device 350. In this regard, the RF enabled device 350 comprises an RF transceiver 308. RF transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to determine the presence, location and/or type of movement of an RFID tag within a facility (e.g., RSF 128 of FIG. 1). Accordingly, the logic controller 310 can store the extracted information in memory 304, and execute algorithms using the extracted information. For example, the logic controller 310 can correlate tag reads with beacon reads to determine the location of the RFID tags within the facility. The logic controller 310 can also perform pattern recognition operations using sensor data received from RFID tags and comparison operations between recognized patterns and pre-stored patterns. The logic controller 310 can further select a time slot from a plurality of time slots based on a tag's unique identifier (e.g., an EPC), and communicate information specifying the selected time slot to the respective RFID tag. The logic controller 310 may additionally determine a WOT during which a given RFID tag's communication device (e.g., transceiver) or operation(s) is(are) to be turned on when motion is detected thereby, and communicate the same to the given RFID tag. The WOT can be determined based on environmental conditions (e.g., temperature, time of day, etc.) and/or system conditions (e.g., amount of traffic, interference occurrences, etc.). Other operations performed by the logic controller 310 will be apparent from the following discussion.

Notably, memory 304 may be a volatile memory and/or a non-volatile memory. For example, the memory 304 can include, but is not limited to, a RAM, a DRAM, an SRAM, a ROM, and a flash memory. The memory 304 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to whether or not RFID tags are present within a facility, where the RFID tags are located within a facility, and/or which RFID tags are in motion at any given time. Other functions of the RF enabled device 350 will become apparent as the discussion progresses.

Figure 4:
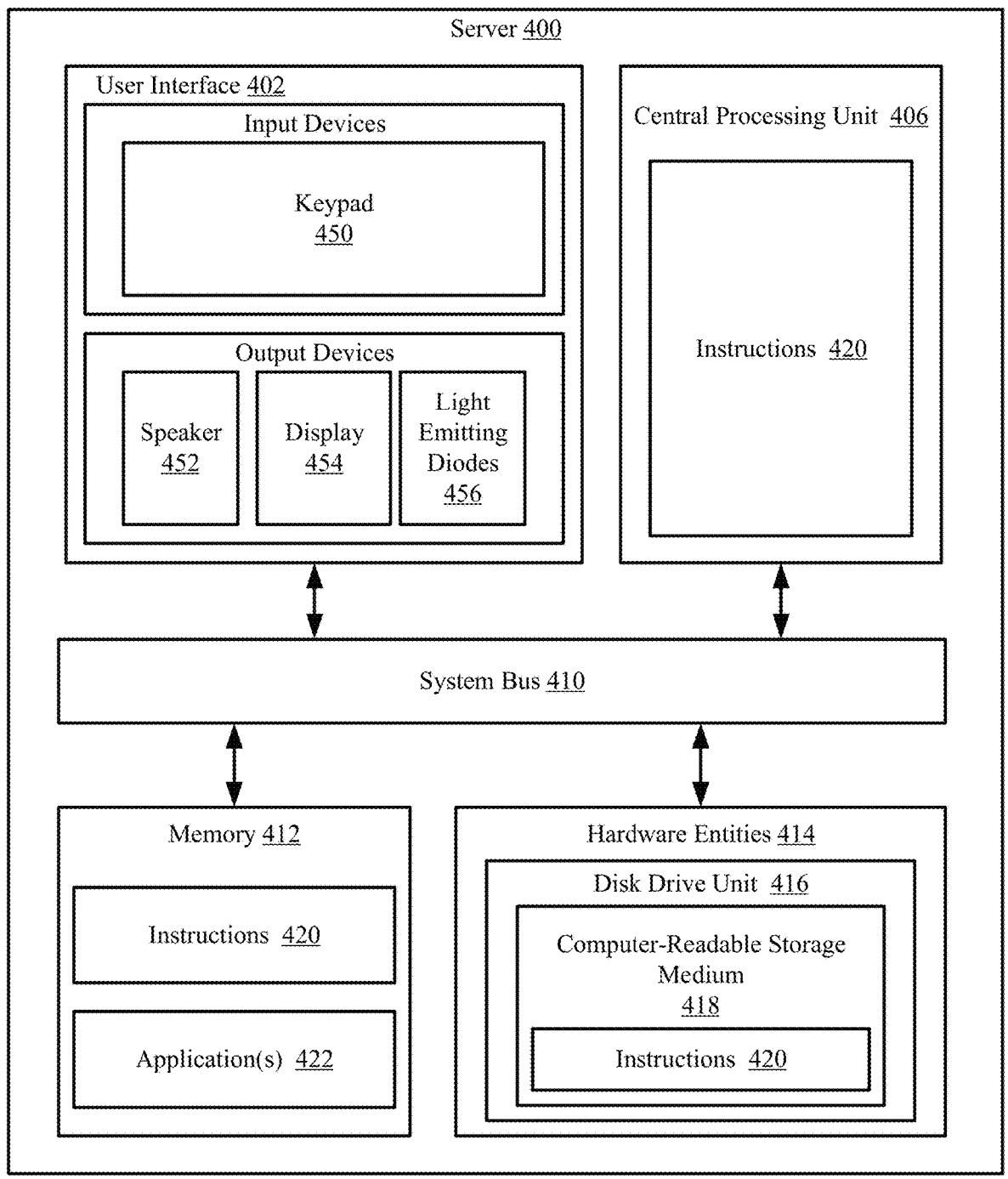
FIG. 4 is an illustration of an illustrative architecture for a server.

Referring now to FIG. 4, there is provided a detailed block diagram of an exemplary architecture for a server 400. Server 124 of FIG. 1 is the same as or substantially similar to server 400. As such, the following discussion of server 400 is sufficient for understanding server 124.

Notably, the server 400 may include more or less components than those shown in FIG. 4. However, the components shown are sufficient to disclose an illustrative embodiment implementing the present solution. The hardware architecture of FIG. 4 represents one embodiment of a representative server configured to facilitate inventory counts, inventory management, and improved customer experiences. As such, the server 400 of FIG. 4 implements at least a portion of a method for (a) determining inventory using time slotted tag communications in accordance with the present solution, (b) providing product information to individuals in real time, and/or (c) allow self-checkout using RFID motion triggered tags.

Some or all the components of the server 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the server 400 comprises a user interface 402, a CPU 406, a system bus 410, a memory 412 connected to and accessible by other portions of server 400 through system bus 410, and hardware entities 414 connected to system bus 410. The user interface can include input devices (e.g., a keypad 450) and output devices (e.g., speaker 452, a display 454, and/or light emitting diodes 456), which facilitate user-software interactions for controlling operations of the server 400.

At least some of the hardware entities 414 perform actions involving access to and use of memory 412, which can be a RAM, a disk driver and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the server 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the server 400 and that cause the server 400 to perform any one or more of the methodologies of the present disclosure.

In some scenarios, the hardware entities 414 include an electronic circuit (e.g., a processor) programmed for facilitating the provision of a three-dimensional map showing locations of RFID tags within a facility and/or changes to said locations in near real-time. In this regard, it should be understood that the electronic circuit can access and run a software application 422 installed on the server 400. The software application 422 is generally operative to facilitate: the determination of RFID tag locations within a facility; the direction of travel of RFID tags in motion; and the mapping of the RFID tag locations and movements in a virtual three dimensional space.

In those or other scenarios, the hardware entities 414 include an electronic circuit (e.g., a processor) programmed for facilitating item inventorying, merchandise sale, and/or customer satisfaction with a shopping experience. In this regard, the electronic circuit can access and run an inventorying software application 422 and an MCD display software application 422 installed on the server 400. The software applications 422 are collectively generally operative to: obtain item level information and/or other information from MCDs and RFID tags; program item level information, accessory information, related product information and/or discount information onto RFID tags and/or MCDs; convert the language, pricing and/or currency symbol of item level information, accessory information, related product information and/or discount information; facilitate registration of RFID tags and MCDs with an enterprise system; and/or determine when MCD display update actions need to be taken based on RFID tag information. Other functions of the software applications 422 will become apparent as the discussion progresses. Such other functions can relate to tag reader control and/or tag control.

Figure 6:
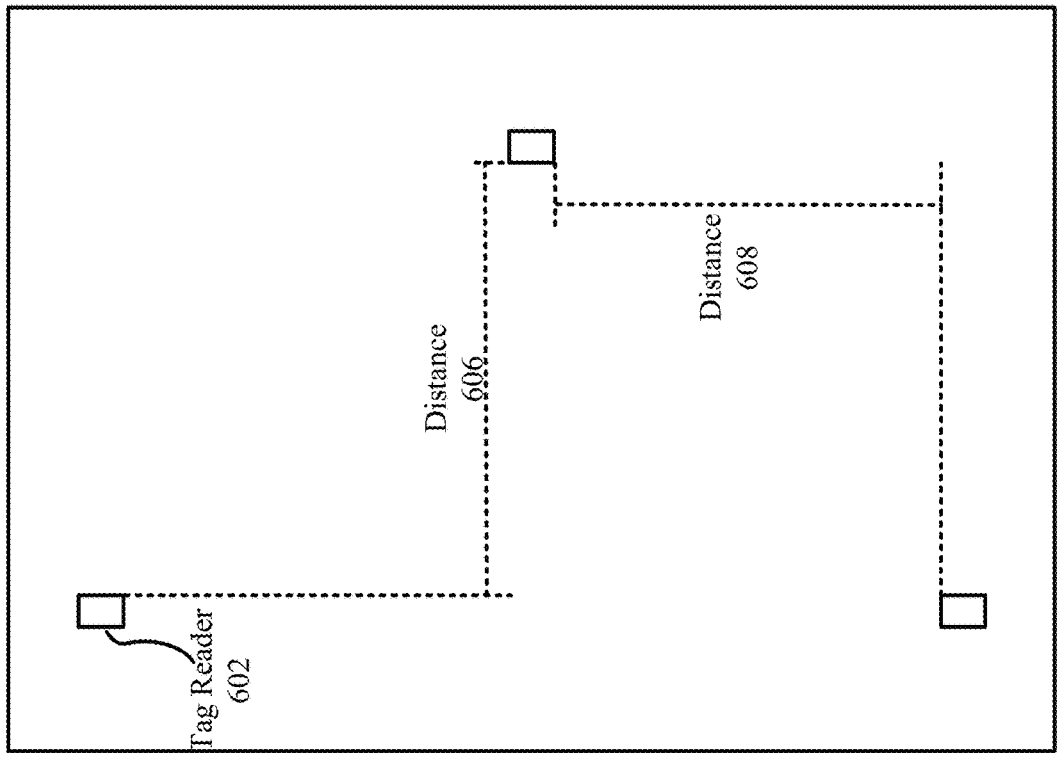
FIG. 6 is an illustration of another illustrative tag reader configuration.
Figure 5:
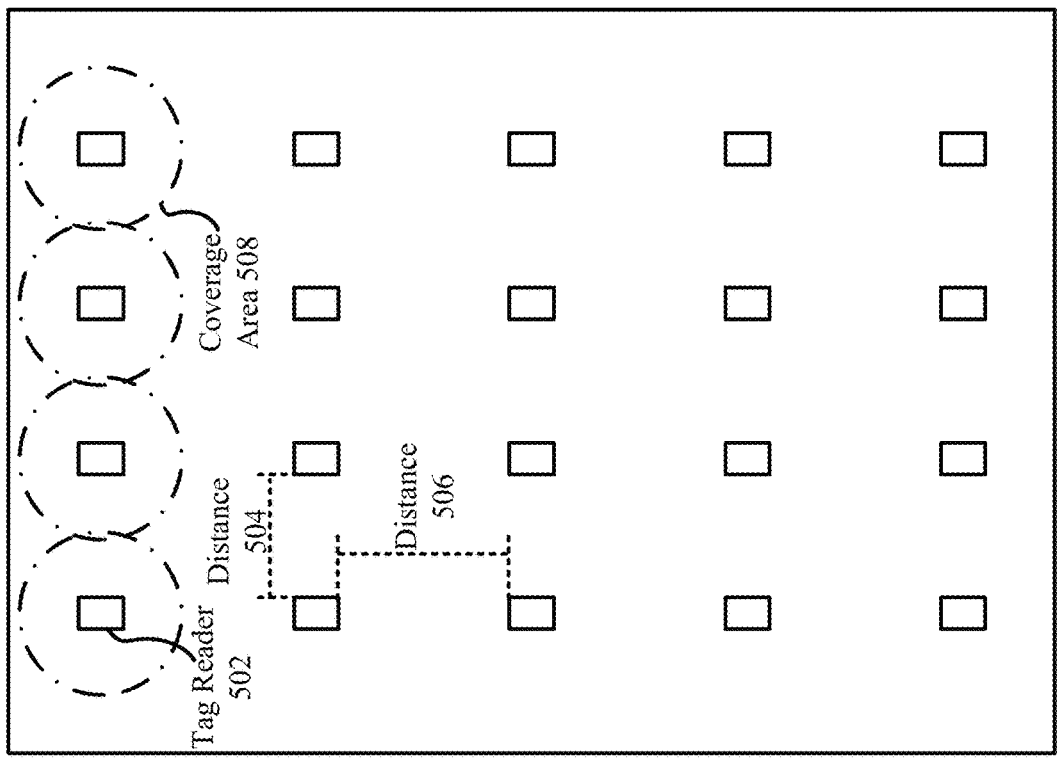
FIG. 5 is an illustration of an illustrative tag reader configuration.

Referring now to FIGS. 5-6, there are provided illustrations that are useful for understanding certain advantages of the present solution. As noted above, the present solution provides RFID tags which can be read by a tag reader located farther away therefrom as compared to that of conventional systems. FIG. 5 shows a tag reader layout for a conventional system. In FIG. 5, there are 20 tag readers 502 with overlapping coverage areas 508. The distance 504, 506 between adjacent tag readers is relatively small (e.g., 9-15 feet apart). In contrast, FIG. 6 shows a tag reader layout for a system implementing the present solution. In FIG. 6, there are advantageously a significantly smaller number of tag readers 602 needed to cover the same area. Accordingly, the distances 606, 608 (e.g., 90-150 feet apart) between adjacent tag readers 602 is much greater than the distances 504, 506 of FIG. 5. Consequently, the present solution has a less resource intensive and less costly infrastructure.

Illustrative Methods for Locating an RF Enabled-Device in a Facility

Figure 7A:
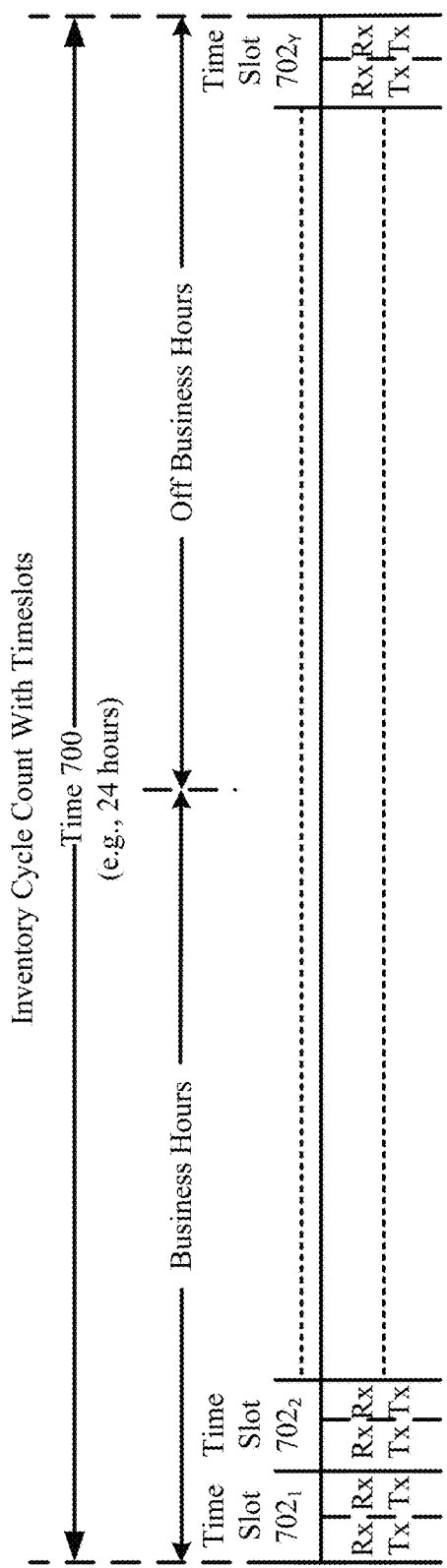
FIGS. 7A-7B (collectively referred to herein as "FIG. 7") provide illustrations that are useful for understanding an inventory cycle count using time slots for communications between tag readers and tags.

Referring now to FIG. 7, there are provided illustrations that are useful for understanding methods for determining inventory using time slotted tag communications. As shown in FIG. 7A, a period of time 700 (e.g., a 24 hour period) is segmented into a plurality of time slots $702_1, 702_2, \ldots, 702_Y$ having equal lengths (e.g., 1 second). During each time slot, at least one RFID tag (e.g., RFID tag $112_1$ of FIG. 1) (A)

receives ("Rx") an interrogation signal transmitted from a tag reader (e.g., tag reader 120 of FIG. 1) and (B) transmits ("Tx") a response signal.

Figure 7B:
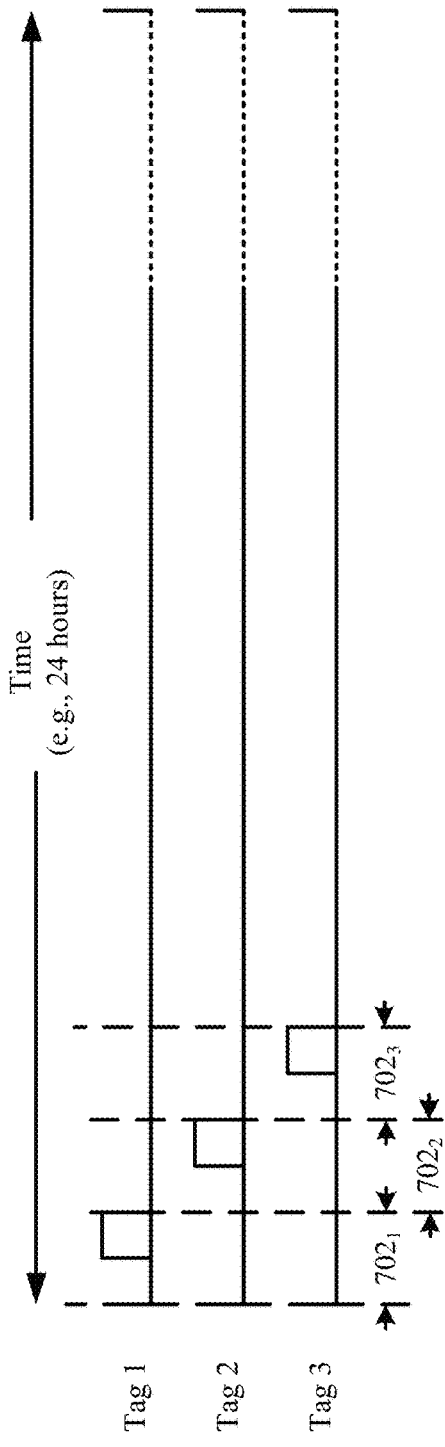

In some scenarios such as that shown in FIG. 7B, a single RFID tag is assigned to each time slot. For example, a first RFID tag is assigned to the first time slot $702_1$. A second RFID tag is assigned to a second time slot $702_2$. A third RFID tag is assigned to a third time slot $702_3$. This time slot assignment can be performed in accordance with a chaotic, random or pseudo-random number algorithm. Alternatively, the time slot assignment can be determined based on the unique codes of the tags (e.g., EPCs, Cyclic Redundancy Check ("CRC") codes, hash codes or outputs of randomizing algorithms). The time slot assignment can be performed by the RFID tags (e.g., RFID tags $112_1, \ldots, 112_N, 118_1, \ldots, 118_X$ of FIG. 1), tag readers (e.g., tag reader(s) 120 of FIG. 1), and/or a remote server (e.g., server 124 of FIG. 1).

In some scenarios, the time slot allocations can be dynamically changed during system operations. For example, a relatively large number of tag read collisions are occurring in the system (e.g., system 100 of FIG. 1). Accordingly, the time slot allocations are changed so as to minimize such tag read collisions. The manner in which time slots are re-allocated can be determined by a single device (e.g., server 124 of FIG. 1) or by a plurality of devices (e.g., RFID tags $112_1, \ldots, 112_N, 118_1, \ldots, 118_X$, tag readers 120 and/or server 124 of FIG. 1).

Figure 8:
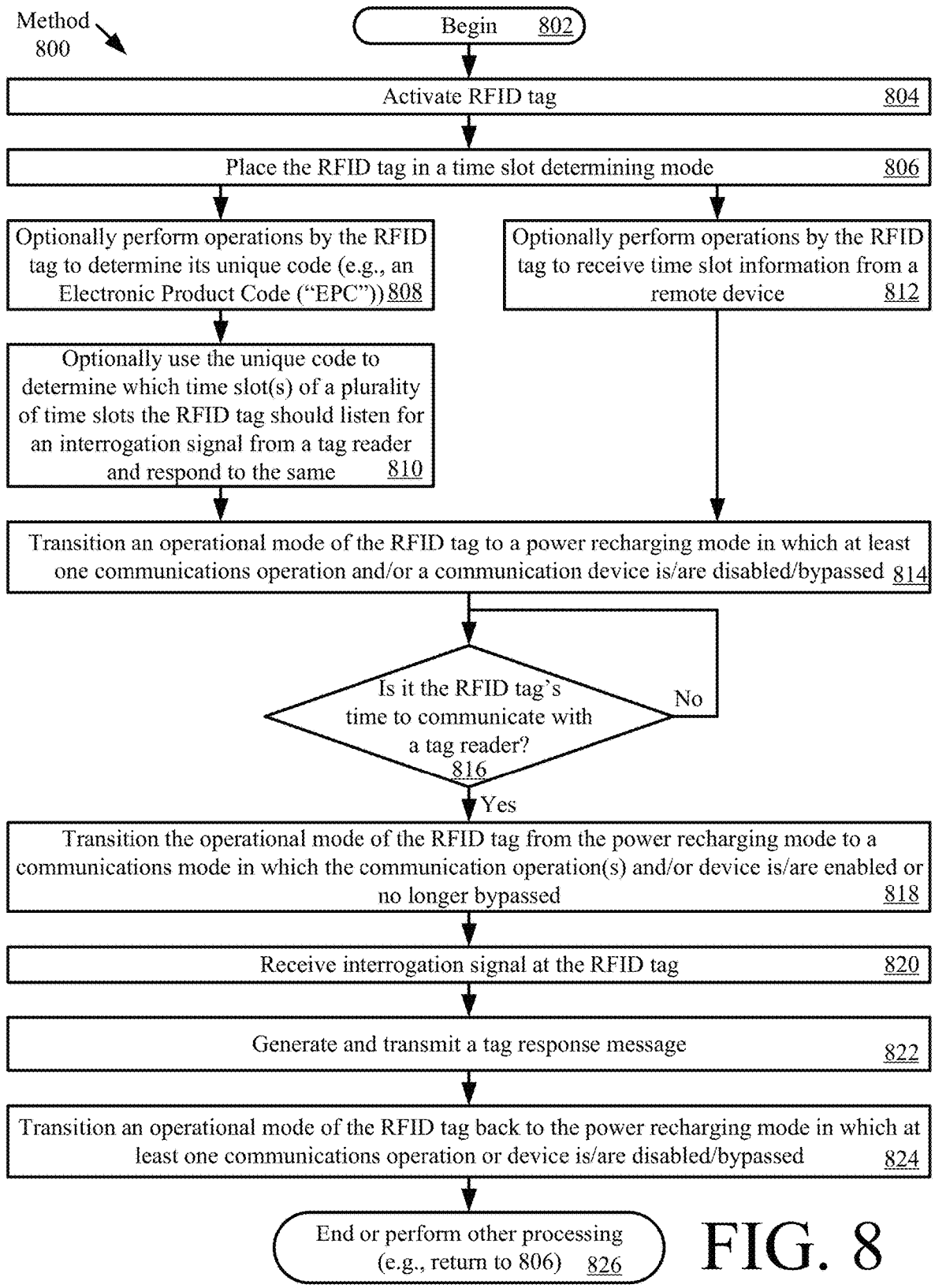
FIG. 8 is a flow diagram of an illustrative method for an inventory cycle count using time slots for communications between tag readers and tags.

Referring now to FIG. 8, there is a flow diagram of an illustrative method 800 for determining an inventory using a time slotted communications scheme such as that shown in FIGS. 7A-7B. Method 800 begins with 802 and continues with 804-806 where an RFID tag (e.g., RFID tags $112_1, \ldots, 112_N, 118_1, \ldots,$ or $118_X$ of FIG. 1) is activated and placed in a time slot determining mode.

In the time slot determining mode, the RFID tag is assigned to a time slot (e.g., time slot $702_1$ of FIG. 7) of a plurality of time slots (e.g., time slots $702_1, 702_2, \ldots, 702_Y$ of FIG. 7). This is achieved through (I) operations performed by the RFID tag and/or (II) operations performed by a remote device (e.g., tag reader 120 of FIG. 1 or server 124 of FIG. 1).

In the first case (I), operations 808-810 are performed by the RFID tag. These operations involve: determining the RFID tag's unique code (e.g., unique ID 224 of FIG. 2); and using the unique code to determine which time slot(s) the RFID tag should listen for an interrogation signal from a tag reader and respond to the same. In this regard, the RFID tag can be programmed with an algorithm for translating the unique code to a time slot value or with a look-up table indicating a mapping of unique codes to time slot values. The translation can be achieved by using the unique code as an input to a pre-defined algorithm to compute a time slot value.

In the second case (II), operations are performed by the remote device(s). These operations involve: selectively assigning at least one time slot to the RFID tag; and communicating information identifying the selectively assigned time slot(s) to the RFID tag. The time slot assignment can be on a chaotic/random/pseudo-random algorithm and/or in accordance with a unique code-to-time slot translation or mapping scheme. Accordingly, FIG. 8 includes optional block 812 where the RFID tag receives time slot information from a remote device.

Upon completing 810 or 812, method 800 continues with 814 where an operational mode of the RFID tag is transitioned from the time slot determining mode to a power recharging mode. In some scenarios, the operational state or mode change is achieved by changing the binary value of at least one state or mode bit (e.g., from 0 to 1, or vice versa) for causing certain communication control operations to be performed by the RFID tag. Additionally or alternatively, a switch can be actuated for creating a closed or open circuit. The present solution is not limited in this regard.

In the power recharging mode, a rechargeable power source (e.g., power source 236 of FIG. 2) is recharged using energy (e.g., RF energy) harvested by an energy harvesting circuit (e.g., energy harvesting circuit 232 of FIG. 2) of the RFID tag. Notably, at least one communication operation and/or the RFID tag's communication device (e.g., communication device 206 of FIG. 2) is disabled or bypassed in the power recharging mode. Other functions/operations of the RFID tag may also be disabled in this mode for power conservation purposes.

Next, a decision is made as to whether it is time for the RFID tag to communicate with a tag reader. This decision can be achieved using knowledge of the time slot(s) assigned to the particular tag. If it is not the RFID tag's time to communicate with a tag reader [816: NO], then method 800 returns to 816. In contrast, if it is the RFID tag's time to communicate with a tag reader [816: YES], then method 800 continues with 818 where the operational mode of the RFID tag is transitioned from the power recharging mode to a communications mode in which at least one communications operations and/or communication device (e.g., transceiver) is enabled or no longer bypassed. Thereafter in 820, an interrogation signal is received at the RFID tag. Interrogation signals are well known in the art, and therefore will not be described herein. In response to the interrogation signal, the RFID tag generates and transmits a tag response message, as shown by 822. Tag response messages are well known in the art, and therefore will not be described herein. Still, it should be noted that the tag response message can include the RFID tag's unique identifier (e.g., unique identifier 224 of FIG. 2) therein. The present solution is not limited to the particulars of 820-822. For example, a number of iterations of communications operations (e.g., transmit and receive operations) can be performed prior to continuing to 824.

Next in 824, the operational mode of the RFID tag is transitioned back to the power recharging mode in which at least communications operations and/or device (e.g., transceiver) is/are disabled and/or bypassed. Subsequently, 826 is performed where method 800 ends or other processing is performed (e.g., return to 806).

The method 800 described above provides a solution to real time inventory, but does not include a way to detect changes to inventory due to removal of RFID tags from an RSF (e.g., RSF 128 of FIG. 1) between respective adjacent time slots (e.g., because of sale or theft). Accordingly, method 800 can be modified to include additional operations for detecting and accounting for tag movement at all times during an inventorying process. Such a modified method is discussed below in relation to FIGS. 9-13.

Figure 9:
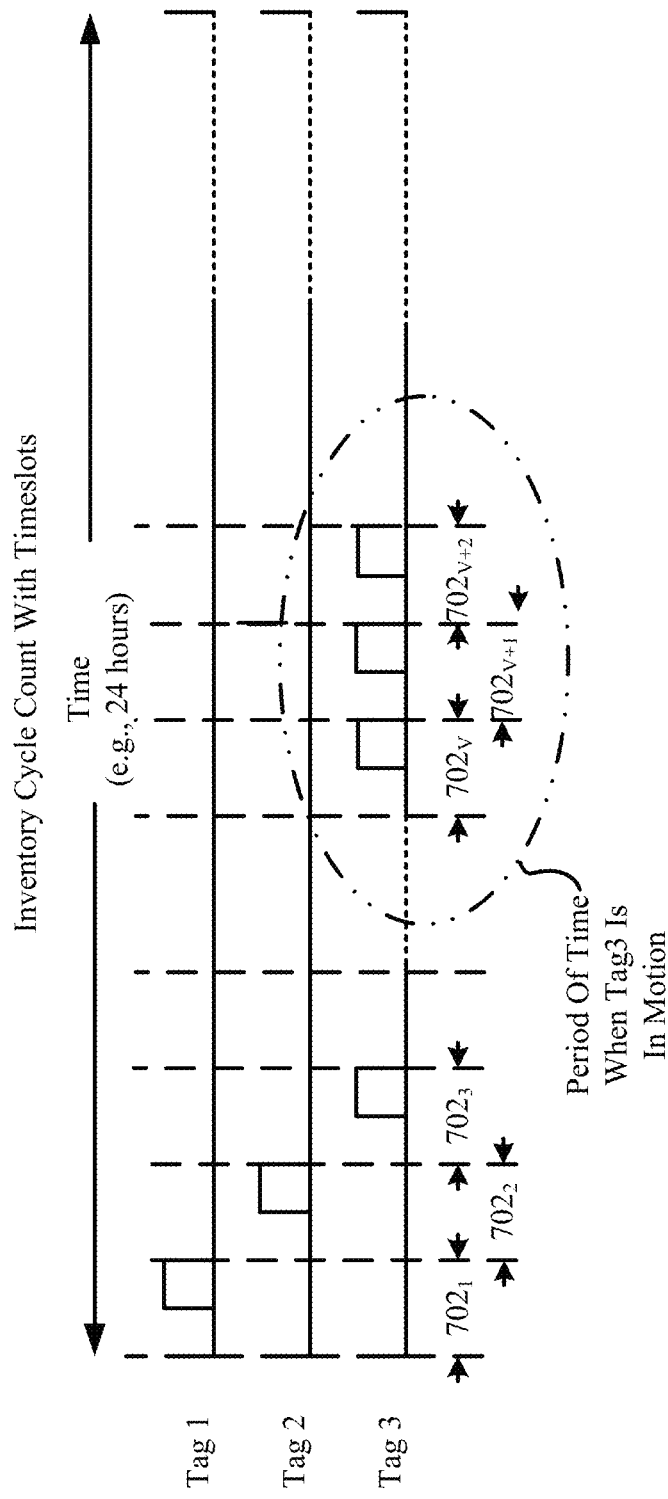
FIG. 9 is an illustration that is useful for understanding an inventory cycle count in which (a) time slots are used for communications between tag readers and tags and (b) a detection of tag motion causes communication enablement.

Referring now to FIG. 9, there is provided an illustration that is useful for understanding methods for determining inventory using motion triggered time slotted tag communications. As shown in FIG. 9, the third tag performs communication (e.g., transceiver) operations in time slots $702_V, 702_{V+1}, 702_{V+2}$ in addition to its assigned time slot $702_3$. These time slots $702_V, 702_{V+1}, 702_{V+2}$ occur during a period of time when the third tag is in motion. This allows tag readers to see moving RFID tags quickly, as well as helps at a Point Of Sale ("POS") and to determine whether the RFID tags were moved into a high risk area (e.g., a fitting room or bathroom).

Referring now to FIGS. 10-11, there are provided illustrations that are useful in understanding the contents of tag response messages. In some scenarios, the tag response message 1000 includes only a unique tag identifier 1002 (e.g., unique ID 224 of FIG. 2). In other scenarios, the tag response message 1100 includes a motion indicator 1104 in addition to the unique tag identifier 1102. The motion indicator 1104 indicates whether the tag is currently in motion, is in a given operational state/mode, and/or has a given motion sensor state.

Figure 12A:
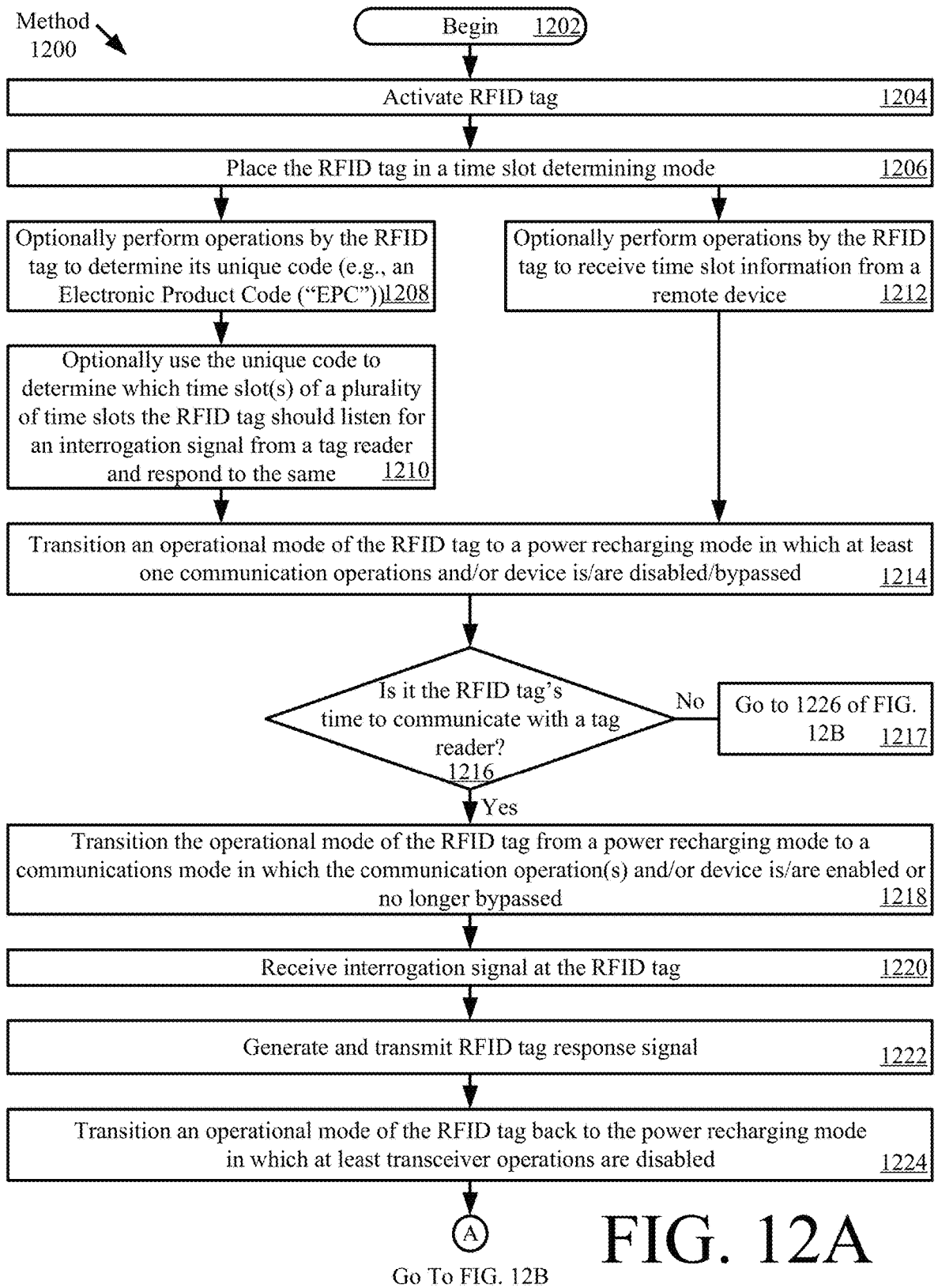
FIGS. 12A-12B (collectively referred to herein as "FIG. 12") provide a flow diagram of an illustrative method for an inventory cycle count.
Figure 12B:
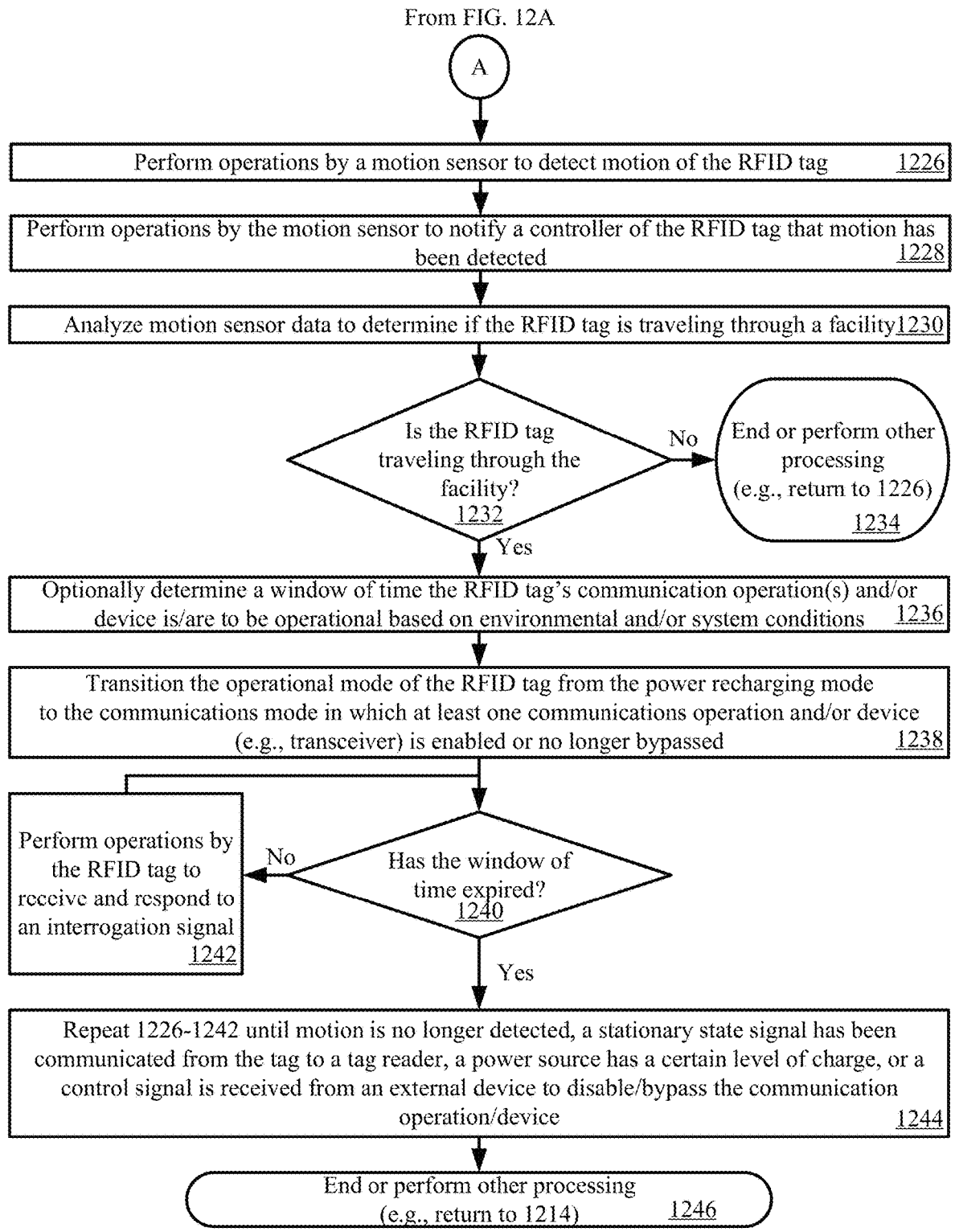

Referring now to FIG. 12, there is provided a flow diagram of an illustrative method 1200 for determining inventory using time slotted tag communications. Method 1200 begins with 1202 and continues with 1204-1224. 1204-1224 are the same as or substantially similar to 804-824 of FIG. 8. The above discussion of 804-824 is sufficient for understanding 1204-1224. Notably, a new block 1217 is provided in which method 800 continues to 1226 of FIG. 12B when a determination is made in 1216 that it is not the RFID tag's time to communicate with the tag reader.

Upon completing 1224, method 1200 continues with 1226 of FIG. 12B. As shown in FIG. 12B, 1226 involves performing operations by a motion sensor (e.g., motion sensor 250 of FIG. 2) to detect motion of the RFID tag (e.g., RFID tag $112i, \ldots, 112_N, 118_1, \ldots,$ or $118_X$ of FIG. 1). Next in 1228, the motion sensor performs operations to notify a controller (e.g., controller 210 of FIG. 2) of the RFID tag that motion has been detected. The motion sensor also provides motion sensor data to the controller. In 1230, the motion sensor data is analyzed to determine if the RFID tag is traveling through a facility. This analysis can be performed by the RFID tag's controller and/or a remote device (e.g., a tag reader or server). The analysis can involve detecting pre-defined patterns of movement specified in the motion sensor data (e.g., a walking pattern, a running pattern, or a vehicle traveling pattern). If a determination is made that the RFID tag is not traveling through a facility (e.g., RSF 128 of FIG. 1) [1232: NO], then 1234 is performed where method 1200 ends or other processing is performed (e.g., return to 1226).

In contrast, if a determination is made that the RFID tag is traveling through a facility [1232: YES], then 1236 is optionally performed where a WOT is determined during which the RFID tag's communication operation(s) and/or communication device (e.g., transceiver) is to be operational, enabled or no longer bypassed. 1236 is optional since the RFID tag can be pre-programmed with a WOT value. In other scenarios, a value for the WOT is determined by the RFID tag and/or a remote device. The WOT value is determined based on environmental conditions and/or system conditions. Notably, the WOT value is variable. This feature of the present solution allows minimization of the RFID tag's system power, minimizes tag read collisions, and identification of moving RFID tags without reading all static/stationary RFID tags.

Once the RFID tag has knowledge of the WOT value, then 1238 is performed where its operational mode is transitioned from the power recharging mode to the communications mode in which at least one communication operation and/or communication device (e.g., transceiver) is enabled or no longer bypassed. In the communications mode, the RFID tag uses an internal clock/timer (e.g., clock/timer 214 of FIG. 1) to determine if the WOT has expired. If not [1240: NO], then the RFID tag performs operations in 1242 to receive and respond to at least one interrogation signal. In so [1240: YES], then 1226-1242 are repeated until motion is no longer detected, a stationary state signal has been communicated from the tag to a tag reader, a power source (e.g., power source 236 of FIG. 2) has a certain level of charge, and/or a control signal is received from an external device to disable or bypass the communication operations and/or device (e.g., transceiver). Subsequently, 1246 is performed where method 1200 ends or other processing is performed (e.g., return to 1214 of FIG. 12A).

The present solution has many advantages. For example, the present solution: solves real time, daily, accurate inventory with a low cost tag reader infrastructure; solves an overhead RFID as EAS problem; is able to accurately track moving tags; identify tags leaving a store even when there are a relatively large number of tags in proximity to the exit; and improves ecommerce processes by providing accurate inventory count and RFID tag locations at all times. The present solution is also greener since it limits the amount of time RF devices are enabled.

The present solution can be used in conjunction with other sensors, such as proximity sensors. For example, if proximity sensors detect the presence of individuals in the facility, then the stationary tag readers can be temporarily disabled (e.g., until there are no more people in the facility).

The RFID tags of the present solution are relatively small with good read range. This allows the RFID tags to be added to animals (e.g., humans, pets, etc.). In this case, the RFID tags can be configured to have enabled communication operations and/or devices (e.g., transceivers) only during times of detected movement thereof. The RFID tags could also be placed on wearable items (e.g., hats, belts, etc.) in a manner that does not interfere with the wearing humans.

Illustrative Methods for Self-Checkout Using Motion Triggered RFID Tags

Retail stores are having to compete with online retailers such as Amazon.com. Therefore, they need to offer a better shopping experience to customers to attract them into the brick and mortar stores. One of the worst problems is waiting in a 5-20 minute line to pay for products after being found. Also, asking for information about the products requires customers to find an employee who are usually busy. Therefore, an enterprise level system that allows one to instantly get information about the price, history, markdowns, medical info, compatible products, and other data is very valuable. If one could see all of this information on his(her) mobile device (e.g., a smart phone) and then accept the price shown, (s)he could pay for the item without talking to anyone and then walk out the door. This is now possible with the above-described RFID tags, enterprise software, and mobile devices (e.g., cell phones and/or smart watches).

The present solution provides an enterprise level software solution that will allow customers to track the products they are carrying, get information on these products in real time, display that information on their mobile devices, get promotion and markdown information on these products, and then verify the price and pay for the products without going to a normal checkout line.

The novel concepts of the present solution include, but are not limited to, the following:
  RFID tags that become fully operational (e.g., battery assisted and communications enabled) when in motion;
  software and analytics that allow enterprise systems to associate an individual (e.g., a customer or a shopper) with the products in their possession;

RFID readers, cameras, beacons, and/or SRC hardware installed in a facility for collecting data useful in the analytics described above;

a device configured to display various information to an individual customer in real time; and/or a secure link into the RSF's database and into the Internet that allows the individual to have data downloaded into his(her) device to allow them to see a current price and other data on the products in his(her) possession.

Figure 13A:
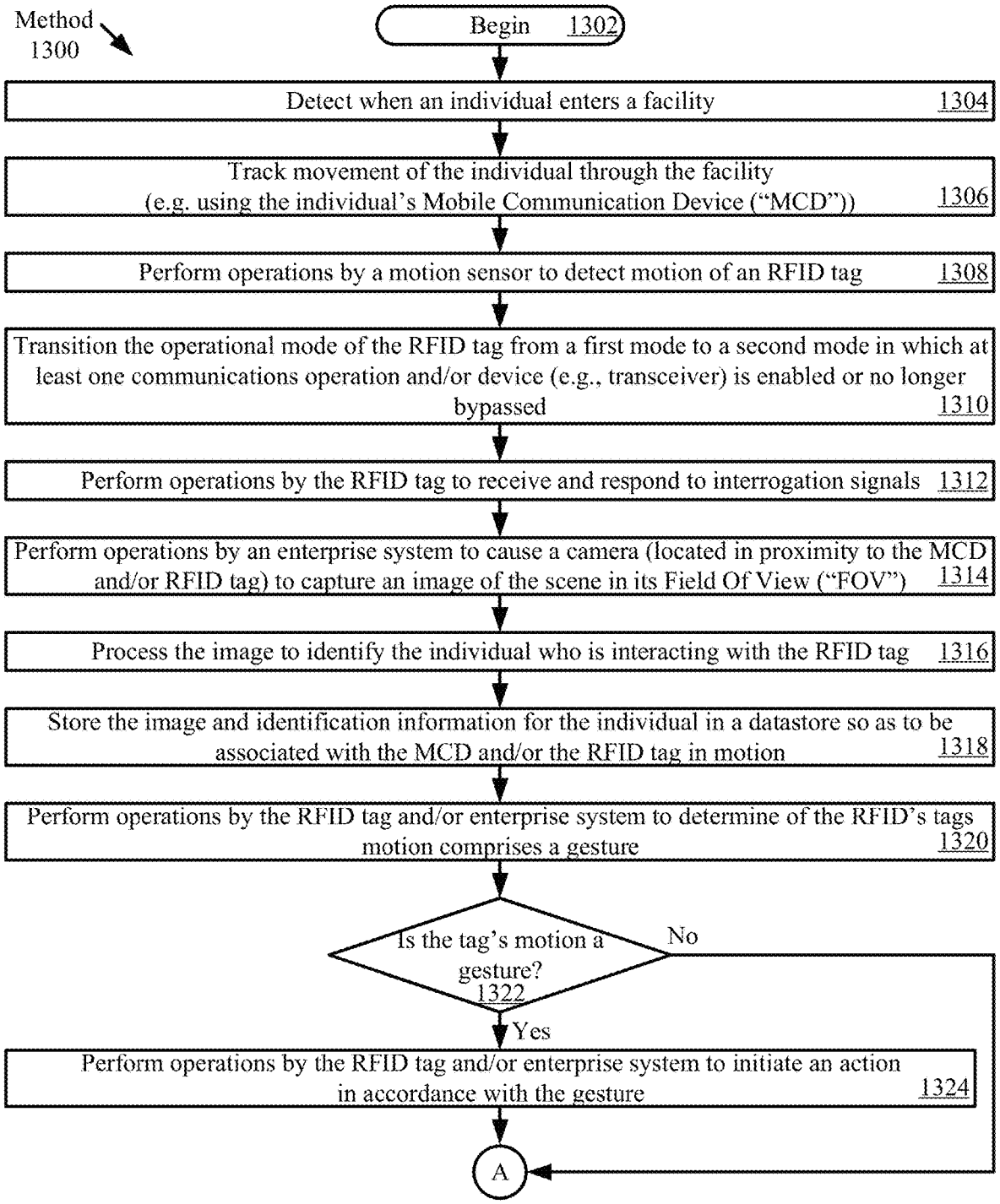

Referring now to FIG. 13, there is provided a flow diagram of an illustrative method 1300 for self-checkout using RFID tags (e.g., RFID tags $112_1$, ..., $112_N$, $118_1$, ..., $118_X$ of FIG. 1) such as those described above. Method 1300 begins with 1302 and continues to 1304 where an enterprise system (e.g., network 144 and server 124 of FIG. 1) detects when an individual enters a facility. In some scenarios, this detection is made via the enterprise system's communication with the individual's MCD (e.g., MCD 130 of FIG. 1). As a result of the communication, the enterprise system obtains a unique identifier for the MCD (e.g., a Media Access Control ("MAC") address). The MAC address is used by the enterprise system as an identifier for the individual (if anonymous) or to access customer related information (e.g., customer related information 142 of FIG. 1) for the individual. The customer related information can include, but is not limited to, customer account information. In those or other scenarios, cameras (e.g., cameras 148 of FIG. 1) are used to detect when the individual enters the facility. Images captured by the cameras are processed to detect whether there is a person in therein. Facial recognition techniques can also be used to identify certain individual (e.g., those that are registered with the enterprise). In those or yet other scenarios, proximity sensors (e.g., beam break sensors) are used to detect when an individual enters the facility.

The enterprise system also performs operations in 1306 to track movement of the individual through a facility (e.g., RSF 128 of FIG. 1). Techniques for tracking an individual's movement are well known in the art, and therefore will not be described herein. Any known or to be known technique for tracking an individual's movement can be used herein without limitation. For example, in some scenarios, the individual's movement is tracked using his(her) MCD. While the individual is traveling through the facility, the MCD periodically or continuously communicates its location to the enterprise system. Information about the MCD's tracked movement is stored in a datastore (e.g., datastore 126 of FIG. 1) along with timestamp information. The present solution is not limited to the particulars of this example.

Next in 1308, a motion sensor (e.g., motion sensor 250 of FIG. 2) performs operations to detect motion of an RFID tag (e.g., RFID tags $112_1$, ..., $112_N$, $118_1$, ..., or $118_X$ of FIG. 1). Responsive to the detected motion, an operational mode of the RFID tag is transitioned from a first mode to a second mode, as shown by 1310. The first mode may include, but is not limited to, a power recharging mode or another mode in which at least one communication operation and/or communication device (e.g., transceiver) of the RFID tag is disabled or bypassed. The second mode includes, but is not limited to, a communications mode in which the at least one communication operation and/or communication device (e.g., transceiver) is enabled or no longer bypassed. In some scenarios, 1310 involves at least some of the operations of the above described blocks 1228-1244 of FIG. 12. When in the second mode, the RFID tag receives and responds to interrogation signals, as shown by 1312.

In 1314, the enterprise system performs operations to: identify at least one camera (e.g., camera 148 of FIG. 1) that is in proximity to the RFID tag's last known location and/or the MCD's last known location; and cause the identified camera to capture an image of a scene in its Field Of View ("FOV"). The image is then stored in a datastore (e.g., datastore 126 of FIG. 1) so as to be associated with the RFID tag, individual and/or individual's MCD. The image can also be processed in 1316 to identify the individual who is interacting with the RFID tag (e.g., via facial recognition). The results of the image processing can be stored in 1318 so as to be associated with the RFID tag, the MCD, the image, and/or a customer account.

Subsequently in 1320, the RFID tag and/or enterprise system determine(s) if the RFID tag's motion comprises a gesture. Techniques for detecting or recognizing gestures are well known in the art, and therefore will not be described herein. Any known or to be known gesture detection or recognition techniques can be used herein without limitation. If a gesture is not detected or recognized [1322: NO], then method 1300 continues with 1326 of FIG. 13B. In contrast, if a gesture is detected or recognized [1322: YES], then method 1300 continues with 1324 where an action is initiated by the RFID tag and/or enterprise system. For example, if the gesture is a gesture for requesting assistance, then a store employee (e.g., store employee 132 of FIG. 1) is dispatched to the last known location of the RFID tag and/or MCD. Alternatively, if the gesture is a gesture for purchasing the object or item, then the object or item is added to the list of objects/items to be purchased and/or a store employee is dispatched to the known location of the object/item so that an anchored chain or cable is detached from the object/item. The present solution is not limited to the particulars of this example.

Upon completing 1324, method 1300 continues with 1326 of FIG. 13B. As shown in FIG. 13B, 1326 involves tracking movement of the RFID tag through the facility. Techniques for tracking RFID tag movement through a facility are well known in the art, and therefore will not be described herein in detail. Any known or to be known technique for tacking RFID tag movement through a facility can be used herein without limitation.

Method 1300 may continue with a plurality of optional blocks 1328-1334. 1328-1334 that involve performing operations by the enterprise system to: obtain customer related information (e.g., a loyalty level) associated with the individual; determine a price discount for the item to which the RFID tag is coupled based on the obtained customer related information and/or stored discount information (e.g., discount information 140 of FIG. 1); communicate the price discount to the RFID tag and/or MCD; and/or communicate the price discount information from the RFID tag to the MCD or other display equipment (e.g., a kiosk with a display screen).

In 1336, the enterprise system performs operations to push item level information (e.g., item level information 134 of FIG. 1), accessory information (e.g., accessory information 136 of FIG. 1), related products information (e.g., related products information 138 of FIG. 1) and/or link information (e.g., hyperlinks for obtaining further information about one or more items) to the MCD or other display equipment. In 1338, the displayed content of the MCD or other display equipment (e.g., a kiosk with a display screen) is changed to include the price discount, item level information, accessory information, related product information, and/or link information.

In some scenarios, 1336 involves: identifying any accessories for the item to which the RFID tag is coupled and/or related products that can be used in conjunction with or as an alternative to the item; and obtaining information associated with the identified accessories and/or related products.

In those or other scenarios, the current location of the RFID tag is used to select the accessories and/or related products which are closest to the RFID tag at any given time. As the RFID tag travels through the facility, different accessories and/or related products are selected. As such, information for different accessories and/or related products is displayed on the MCD or other display equipment at different times while the RFID tag is traveling through the facility. Thus, the MCD or other display equipment provides dynamically changing displayed content for improving an individual's shopping experience and/or increasing a retail store's overall sales.

Referring again to FIG. 13B, method 1300 continues with optional block 1340 where the MCD or other display equipment receives a user-software interaction for viewing further information about one or more items. In response to the user-software interaction, the MCD or other display equipment obtains the further information from the enterprise system and presents the same to the user.

Next in 1342, the MCD or a payment kiosk receives a user software-interaction for purchasing the items in the individual's possession. Payment kiosks are well known in the art, and therefore will not be described herein in detail. Any known or to be known payment kiosk can be used herein without limitation. In response to the user-software interaction, the MCD or payment kiosk performs operations to complete a purchase transaction. The MCD and/or payment kiosk may also optionally cause the RFID tag to be detached from the item and/or cause an anchored chain or cable to be detached from the item, as shown by 1346. Subsequently, 1348 is performed where method 1300 ends or other processing is performed (e.g., return to 1304).

The above described method 1300 is possible because of easier to read motion RFID tags, combined information and analytics about product and human motion, and the ability to link RFID tags to a display device that allows purchasing the products without waiting in long lines. A smart phone with a low power RFID reader may be employed to improve the accuracy of the system. If only moving RFID tags are readable, then it is easier to determine which products are linked to which individuals.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for self-checkout using a Radio Frequency Identification ("RFID") tag, comprising:
   detecting motion of the RFID tag using a motion sensor local to the RFID tag;
   enabling at least one communication operation of the RFID tag in response to the detection of the RFID tag's motion;
   performing operations by the RFID tag to communicate first information to an enterprise system;
   using the first information by the enterprise system to associate the RFID tag with an individual of a plurality of individuals present in a given facility;
   dynamically changing displayed content of a display device to include information about an item to which the RFID tag is coupled to facilitate generation of a list of items for use during the self-checkout, the display device being near the individual, in the possession of the individual or being worn by the individual;
   determining whether the RFID tag's motion comprises a gesture; and
   adding the item to the list of items to be purchased during the self-checkout, in accordance with the gesture;
   wherein the first information is communicated to the enterprise system from the RFID tag in accordance with a time slotted communications scheme in which a plurality of time slots are respectively assigned to a plurality of RFID tags such that less than all active ones of the RFID tags present in a coverage area of an interrogator respond to interrogation signals during a time slot, the time slot is assigned based on a unique code of the RFID tag, and the unique code comprises one of an Electronic Product Code ("EPC") and a Cyclic Redundancy Check ("CRC") code.

2. The method according to claim 1, further comprising:
   identifying at least one camera that is near a last known location of the RFID tag; and
   causing the at least one camera to capture an image of a scene in the camera's Field Of View ("FOV").

3. The method according to claim 2, further comprising processing the image to identify the individual who is interacting with the RFID tag.

4. The method according to claim 1, further comprising:
   analyzing data generated by the motion sensor to determine if the RFID tag is traveling through the given facility; and
   tracking movement of the RFID tag through the given facility.

5. The method according to claim 1, further comprising disabling the at least one communication operation when motion of the RFID tag is no longer detected for a given period of time.

6. A Radio Frequency Identification ("RFID") tag, comprising:
   a motion sensor configured to detect motion of the RFID tag; and
   a circuit:
      coupled to the motion sensor,
      and configured to:
         enable at least one communication operation in response to the detection of the RFID tag's motion,
         determine whether the RFID tag's motion comprises a gesture, and
         communicate information to initiate an action for assisting an individual in accordance with the gesture, wherein the action comprises adding an item associated with the RFID tag to a list of items to be purchased;
   wherein the information is communicated from the RFID tag during a time slot of a plurality of time slots that is assigned to the RFID tag, the time slot is assigned based on a unique code of the RFID tag, and the unique code comprises one of an Electronic Product Code ("EPC") and a Cyclic Redundancy Check ("CRC") code.

7. The RFID tag according to claim 6, wherein the circuit is further configured to disable the at least one communication operation when motion of the RFID tag is no longer detected for a given period of time.

8. A system, comprising:
a Radio Frequency Identification ("RFID") tag comprising:
   a motion sensor configured to detect motion of the RFID tag, and
   a circuit configured to enable at least one communication operation of the RFID tag in response to the detection of the RFID tag's motion, and communicate first information therefrom,
   wherein the information is communicated from the RFID tag during a time slot of a plurality of time slots that is assigned to the RFID tag, the time slot is assigned based on a unique code of the RFID tag, and the unique code comprises one of an Electronic Product Code ("EPC") and a Cyclic Redundancy Check ("CRC") code, and an external device configured to:
   receive the first information,
   use the first information to associate the RFID tag with an individual of a plurality of individuals present in a given facility, and
   cause displayed content of a display device to be dynamically changed to include information about an object to which the RFID tag is coupled, where the display device is near the individual, in the possession of the individual or being worn by the individual;
   determine whether the RFID tag's motion comprises a gesture; and
   add the object to a list of items to be purchased during self-checkout, in accordance with the gesture.

9. The system according to claim 8, wherein the external device is further configured to identify at least one camera that is near a last known location of the RFID tag, cause the at least one camera to capture an image of a scene in the camera's Field Of View ("FOV"), and process the image to identify the individual who is interacting with the RFID tag.

* * * * *

UNITED STATES PATENT AND TRADEMARK OFFICE
CERTIFICATE OF CORRECTION

PATENT NO. : 10,943,228 B2
APPLICATION NO. : 16/249233
DATED : March 9, 2021
INVENTOR(S) : Trivelpiece et al.

Page 1 of 1

It is certified that error appears in the above-identified patent and that said Letters Patent is hereby corrected as shown below:

In the Specification

In Column 5, Line 11, delete "timing." and insert -- timing; --, therefor.

In Column 5, Line 65, delete "location the objects" and insert -- location of the objects --, therefor.

In Column 6, Line 38, delete "110i," and insert -- 1101, --, therefor.

In Column 7, Line 32, delete "tacking" and insert -- tracking --, therefor.

In Column 10, Line 40, delete "is be" and insert -- is to be --, therefor.

In Column 13, Lines 61-62, delete "tag reader 200." and insert -- tag reader 300. --, therefor.

In Column 13, Line 62, delete "tag reader 200" and insert -- tag reader 300 --, therefor.

In Column 14, Line 12, delete "tag reader 200" and insert -- tag reader 300 --, therefor.

In Column 19, Line 28, delete "112i," and insert -- 1121, --, therefor.

In Column 20, Line 42, delete "minute" and insert -- minutes --, therefor.

In Column 22, Line 41, delete "tacking" and insert -- tracking --, therefor.

In the Claims

In Column 26, Line 2, in Claim 8, delete "information," and insert -- information; --, therefor.

In Column 26, Line 5, in Claim 8, delete "facility, and" and insert -- facility; --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*